(12) United States Patent
Amano

(10) Patent No.: US 8,904,761 B2
(45) Date of Patent: Dec. 9, 2014

(54) CONTROL APPARATUS FOR POWER UNIT

(75) Inventor: Takashi Amano, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 327 days.

(21) Appl. No.: 13/557,936

(22) Filed: Jul. 25, 2012

(65) Prior Publication Data

US 2013/0025263 A1    Jan. 31, 2013

(30) Foreign Application Priority Data

Jul. 26, 2011   (JP) .................. 2011-162779

(51) Int. Cl.
| | |
|---|---|
| F01N 3/18 | (2006.01) |
| B60W 20/00 | (2006.01) |
| F02N 11/08 | (2006.01) |
| B60K 6/445 | (2007.10) |
| B60W 10/06 | (2006.01) |
| F02D 41/02 | (2006.01) |

(52) U.S. Cl.
CPC ........... F02N 11/0822 (2013.01); B60W 20/00 (2013.01); *F02N 2200/026* (2013.01); *F02D 41/0235* (2013.01); B60K 6/445 (2013.01); *Y02T 10/48* (2013.01); *Y02T 10/54* (2013.01); *F02N 11/0829* (2013.01); *Y02T 10/6239* (2013.01); B60W 10/06 (2013.01)
USPC .......................................................... 60/285

(58) Field of Classification Search
USPC ................................................... 60/284, 285
See application file for complete search history.

(56) References Cited

FOREIGN PATENT DOCUMENTS

| | | |
|---|---|---|
| JP | 2004-124827 A | 4/2004 |
| JP | 2010-083232 A | 4/2010 |
| JP | 2010-137605 A | 6/2010 |

*Primary Examiner* — Thomas Denion
*Assistant Examiner* — Jonathan Matthias
(74) *Attorney, Agent, or Firm* — Gifford, Krass, Sprinkle, Anderson & Citkowski, P.C.

(57) ABSTRACT

A control apparatus for a power unit equipped with an internal combustion engine and outputs a power. The control apparatus according to the invention starts engine operation when the required power becomes equal to or larger than an engine start threshold during engine stop, and stops engine operation when the required power becomes equal to or smaller than an engine stop threshold during engine operation. The internal combustion engine is equipped with a catalyst. When the purification capacity of the catalyst is lower than a start threshold correction threshold, a value smaller than a reference engine start threshold is set as the engine start threshold. When the purification capacity of the catalyst is equal to or higher than the start threshold correction threshold, a value equal to the reference engine start threshold or a value larger than the reference engine start threshold is set as the engine start threshold.

15 Claims, 8 Drawing Sheets

CONTROL APPARATUS FOR POWER UNIT

CROSS REFERENCE TO RELATED APPLICATIONS

This application claims priority to Japanese Patent Application No. 2011-162779 filed on Jul. 26, 2011, which is incorporated herein by reference in its entirety including the specification, drawings and abstract.

BACKGROUND OF THE INVENTION

1. Field of the Invention

The invention relates to a control apparatus for a power unit.

2. Description of Related Art

A power output unit that is provided with an internal combustion engine equipped with a catalyst that purifies components in exhaust gas discharged from a combustion chamber is described in Japanese Patent Application Publication No. 2004-124827 (JP-2004-124827 A). This power output unit is configured to be capable of performing the control (this control will be referred to hereinafter as "engine start/stop control) of starting and stopping the operation of the internal combustion engine (this operation will be referred to hereinafter as "engine operation"). Besides, this power output unit starts or stops engine operation when the purification rate of the catalyst is higher than a certain predetermined value during the performance of engine start/stop control. However, if engine operation has already been started when the purification rate of the catalyst is equal to or lower than the aforementioned predetermined value during the performance of engine start/stop control, the power output unit prohibits the engine operation from being stopped and continues the engine operation. If engine operation has been stopped, the power output unit starts the engine operation, prohibits the engine operation from being stopped, and continues the engine operation.

One of the reasons why the power output unit described in Japanese Patent Application Publication No. 2004-124827 (JP-2004-124827 A) performs the aforementioned control in accordance with the purification rate of the catalyst consists in preventing the emission properties of exhaust gas flowing out from the catalyst from deteriorating by suppressing a decrease in the purification rate of the catalyst. That is, since fuel is stopped from being supplied to the combustion chamber in stopping engine operation, combustion does not occur in the combustion chamber. On the other hand, however, gas is discharged from the combustion chamber. Accordingly, until a certain period elapses after the supply of fuel to the combustion chamber is stopped, a gas containing a large amount of oxygen is discharged from the combustion chamber, and the gas flows into the catalyst. Then, when this gas containing a large amount of oxygen flows into the catalyst, the catalyst may deteriorate. It should be noted herein that if the catalyst deteriorates when the purification rate of the catalyst is relatively low, it is impossible to sufficiently purify components to be purified by the catalyst when the exhaust gas containing the components flows into the catalyst.

However, in the power output unit described in Japanese Patent Application Publication No. 2004-124827 (JP-2004-124827 A), when the purification rate of the catalyst is relatively low (i.e., when the purification rate of the catalyst is equal to or lower than the aforementioned predetermined time), engine operation is prohibited from being stopped. Therefore, the gas containing a large amount of oxygen is restrained from flowing into the catalyst, so that the catalyst is restrained from deteriorating. Thus, the emission properties of exhaust gas flowing out from the catalyst are prevented from deteriorating.

Meanwhile, the catalyst exerts its highest purification capacity when the temperature thereof is equal to or higher than a so-called activation temperature. Accordingly, in order to cause the catalyst to exert high purification capacity when exhaust gas flows into the catalyst, it is effective to hold the temperature of the catalyst equal to or higher than the activation temperature. In the power output unit described in Japanese Patent Application Publication No. 2004-124827 (JP-2004-124827 A), the temperature of the catalyst is low. As a result, engine operation is started if the engine operation has been stopped when the purification rate of the catalyst is lower than the aforementioned predetermined value, and the engine operation is prohibited from being stopped and is continued if the engine operation has already been performed. Thus, when the purification rate of the catalyst is lower than the aforementioned predetermined value as a result of a low temperature of the catalyst, engine operation is performed, and exhaust gas at a relatively high temperature flows into the catalyst. Therefore, the temperature of the catalyst rises, so that the purification rate of the catalyst increases.

However, the start of engine operation and the continuation of the engine operation by the power output unit described in Japanese Patent Application Publication No. 2004-124827 (JP-2004-124827 A) at the time when the purification rate of the catalyst is lower than the aforementioned predetermined value are the start and continuation that are not carried out when the purification rate of the catalyst is equal to or higher than the aforementioned predetermined value. Therefore, fuel is consumed correspondingly, and as a result, a deterioration in fuel economy is caused. Further, in the case where the power output unit is mounted on a vehicle and is designed to start and stop engine operation in accordance with a request made by a driver of the vehicle, if the power output unit starts engine operation as in the case of the power output unit described in Japanese Patent Application Publication No. 2004-124827 (JP-2004-124827 A) when the purification rate of the catalyst is lower than the aforementioned predetermined value, a sense of discomfort may be caused to the driver.

SUMMARY OF THE INVENTION

Thus, the invention of the present application provides a control apparatus for a power unit that holds the purification capacity of a catalyst high while suppressing a deterioration in fuel economy and preventing a sense of discomfort from being caused to a driver.

According to one aspect of the invention of the present application, there is provided a control apparatus for a power unit that is equipped with an internal combustion engine and outputs a power. The control apparatus for this power unit is equipped with a controller. The controller sets, as an engine start threshold, a threshold that concerns an output power as a power output from the power unit and is used to determine whether to start operation of the internal combustion engine or not, and sets, as an engine stop threshold, a threshold that concerns an output power and is used to determine whether to stop operation of the internal combustion engine or not. Besides, the controller starts operation of the internal combustion engine when a required power as an output power required of the power unit during stop of operation of the internal combustion engine becomes equal to or larger than the engine start threshold, and stops operation of the internal combustion engine when the required power becomes equal to or smaller than the engine stop threshold during operation of the internal combustion engine.

In the power unit, the internal combustion engine is equipped with a catalyst that purifies components in exhaust gas discharged from a combustion chamber of the internal combustion engine. Besides, the controller obtains a reference engine start threshold that is an output power equal to or larger than zero and has been prepared in advance as a criterion for setting the engine start threshold; obtains a reference engine stop threshold that is a threshold equal to or larger than zero and has been prepared in advance as a criterion for setting the engine stop threshold; and obtains a start threshold correction threshold that is a threshold equal to or larger than zero and has been prepared in advance as a criterion which concerns a purification capacity of the catalyst and is used to determine whether to correct the reference engine start threshold or not. Besides, the controller sets a value smaller than the reference engine start threshold as the engine start threshold when the purification capacity of the catalyst is lower than the start threshold correction threshold, sets a value equal to the reference engine start threshold or a value larger than the reference engine start threshold as the engine start threshold when the purification capacity of the catalyst is equal to or higher than the start threshold correction threshold, and sets a value equal to the reference engine stop threshold as the engine stop threshold regardless of the purification capacity of the catalyst.

It should be noted in the control apparatus that the engine start threshold that is set when the purification capacity of the catalyst is lower than the start threshold correction threshold may be a value smaller than the reference engine start threshold, and is not limited to a specific value. Accordingly, in the invention, the engine start threshold that is set when the purification capacity of the catalyst is lower than the start threshold correction threshold may be, for example, a value that is smaller than the reference engine start threshold by a certain value regardless of the purification capacity of the catalyst, a value that decreases as the purification capacity of the catalyst decreases with respect to the start threshold correction threshold (i.e., this value is a value that monotonically decreases as the purification capacity of the catalyst decreases with respect to the start threshold correction threshold), or a value that stepwise decreases as the purification capacity of the catalyst decreases with respect to the start threshold correction threshold (i.e., this value is a value that stepwise decreases as the purification capacity of the catalyst decreases with respect to the start threshold correction threshold).

Further, in the control apparatus, in the case where a value larger than the reference engine start threshold is set as the engine start threshold when the purification capacity of the catalyst is equal to or higher than the start threshold correction threshold, the engine start threshold may be a value equal to or larger than the reference engine start threshold, and is not limited to a specific value. Accordingly, in the invention, the engine start threshold that is set to a value larger than the reference engine start threshold when the purification capacity of the catalyst is equal to or higher than the start threshold correction threshold may be, for example, a value that is larger than the reference engine start threshold by a certain value regardless of the purification capacity of the catalyst, a value that increases as the purification capacity of the catalyst increases with respect to the start threshold correction threshold (i.e., this value is a value that monotonically increases as the purification capacity of the catalyst increases with respect to the start threshold correction threshold), or a value that stepwise increases as the purification capacity of the catalyst increases with respect to the start threshold correction threshold (i.e., this value is a value that stepwise increases as the purification capacity of the catalyst increases with respect to the start threshold correction threshold).

The invention is advantageous in that the purification capacity of the catalyst can be held high while suppressing a deterioration in fuel economy and preventing a sense of discomfort from being caused to the driver. That is, in the control apparatus, when the purification capacity of the catalyst is equal to or higher than the start threshold correction threshold, a value equal to the reference engine start threshold or a value larger than the reference engine start threshold is set as the engine start threshold. On the other hand, in the control apparatus, when the purification capacity of the catalyst is lower than the start threshold correction threshold, a value smaller than the reference engine start threshold is set as the engine start threshold. Accordingly, the engine start threshold at the time when the purification capacity of the catalyst is lower than the start threshold correction threshold is smaller than the engine start threshold at the time when the purification capacity of the catalyst is equal to or higher than the start threshold correction threshold. Thus, when the necessity to start operation of the internal combustion engine arises due to an increase in the required power, the operation of the internal combustion engine is started earlier in the case where the purification capacity of the catalyst is lower than the start threshold correction threshold than in the case where the purification capacity of the catalyst is equal to or higher than the start threshold correction threshold. Then, as a result, the duration time of the operation of the internal combustion engine is prolonged. Thus, the temperature of the catalyst can be raised to a higher temperature, so that the purification capacity of the catalyst is enhanced.

Besides, when the required power increases, the operation of the internal combustion engine is started at any rate. Therefore, the start of the operation of the internal combustion engine according to the invention at the time when the purification capacity of the catalyst is lower than the start threshold correction threshold is the start of the operation of the internal combustion engine which is necessary at any rate, and not the unnecessary start of the operation of the internal combustion engine, and is also the start of engine operation that is intended or envisaged by the driver. Thus, even if the operation of the internal combustion engine is started early as a result of a state where the purification capacity of the catalyst is lower than the start threshold correction threshold, a deterioration in fuel economy is suppressed, and a sense of discomfort is prevented from being caused to the driver of a vehicle in the case where the internal combustion engine according to the invention is mounted on the vehicle. From this point of view, according to the invention, the purification capacity of the catalyst can be held high while suppressing a deterioration in fuel economy and preventing a sense of discomfort from being caused to the driver.

Further, according to another aspect of the invention, there is provided a control apparatus for a power unit that outputs a power and is equipped with an internal combustion engine and a catalyst that purifies components in exhaust gas discharged from a combustion chamber of the internal combustion engine. This control apparatus is equipped with a controller. This controller performs the following control. That is, the controller sets, as an engine start threshold, a threshold that concerns an output power as a power output from the power unit and is used to determine whether to start operation of the internal combustion engine or not; sets, as an engine stop threshold, a threshold that concerns an output power and is used to determine whether to stop operation of the internal combustion engine or not; starts operation of the internal combustion engine when a required power as an output power required of the power unit during stop of operation of the internal combustion engine becomes equal to or larger than the engine start threshold; and stops operation of the internal combustion engine when the required power becomes equal to or smaller than the engine stop threshold during operation of the internal combustion engine. Also, the controller obtains a reference engine start threshold that is an output power larger than zero and has been prepared in advance as a criterion for setting the engine start threshold, obtains a reference engine stop threshold that is an output power equal to or larger than zero and has been prepared in advance as a criterion for setting the engine stop threshold; and obtains a start threshold correction threshold that is a threshold equal to or larger than zero and has been prepared in advance as a criterion which concerns a purification capacity of the catalyst and is used to determine whether to correct the reference engine start threshold or not. The controller sets a value smaller than the reference engine start threshold as the engine start threshold when the purification capacity of the catalyst is lower than the start threshold correction threshold. The controller sets a value equal to the reference engine start threshold or a value larger than the reference engine start threshold as the engine start threshold when the purification capacity of the catalyst is equal to or higher than the start threshold correction threshold. Furthermore, the controller obtains a stop threshold correction threshold that is a threshold equal to or larger than zero and has been prepared in advance as a threshold which concerns the purification capacity of the catalyst and is used to determine whether to correct the reference engine stop threshold, which is a value larger than zero, or not. Besides, the controller sets, as the engine stop threshold, a value smaller than the reference engine stop threshold when the purification capacity of the catalyst is lower than the stop threshold correction threshold, and sets, as the engine stop threshold, a value equal to the reference engine stop threshold or a value larger than the reference engine stop threshold when the purification capacity of the catalyst is equal to or higher than the stop threshold correction threshold.

It should be noted in the control apparatus that the engine start threshold that is set when the purification capacity of the catalyst is lower than the stop threshold correction threshold may be a value smaller than the reference engine stop threshold, and is not limited to a specific value. Accordingly, in the invention, the engine start threshold that is set when the purification capacity of the catalyst is lower than the stop threshold correction threshold may be, for example, a value that is smaller than the reference engine stop threshold by a certain value, a value that decreases as the purification capacity of the catalyst decreases with respect to the stop threshold correction threshold (i.e., this value is a value that monotonically decreases as the purification capacity of the catalyst decreases with respect to the stop threshold correction threshold), or a value that stepwise decreases as the purification capacity of the catalyst decreases with respect to the stop threshold correction threshold (i.e., this value is a value that stepwise decreases as the purification capacity of the catalyst decreases with respect to the stop threshold correction threshold).

Further, in the control apparatus, in the case where a value larger than the reference engine stop threshold is set as the engine stop threshold when the purification capacity of the catalyst is equal to or higher than the stop threshold correction threshold, the engine stop threshold may be a value equal to or larger than the reference engine stop threshold, and is not limited to a specific value. Accordingly, in the invention, the engine stop threshold that is set to a value larger than the reference engine stop threshold when the purification capacity of the catalyst is equal to or higher than the stop threshold correction threshold may be, for example, a value that is larger than the reference engine stop threshold by a certain value, a value that increases as the purification capacity of the catalyst increases with respect to the stop threshold correction threshold (i.e., this value is a value that monotonically increases as the purification capacity of the catalyst increases with respect to the stop threshold correction threshold), or a value that stepwise stepwise increases as the purification capacity of the catalyst increases with respect to the stop threshold correction threshold (i.e., this value is a value that stepwise increases as the purification capacity of the catalyst increases with respect to the stop threshold correction threshold).

The control apparatus is advantageous in that the purification capacity of the catalyst can be held high while suppressing a deterioration in fuel economy and preventing a sense of discomfort from being caused to the driver. That is, in the invention, when the purification capacity of the catalyst is equal to or higher than the start threshold correction threshold, a value equal to the reference engine start threshold or a value larger than the reference engine start threshold is set as the engine start threshold. On the other hand, in the control apparatus, when the purification capacity of the catalyst is lower than the start threshold correction threshold, a value smaller than the reference engine start threshold is set as the engine start threshold. Thus, as described above, the purification capacity of the catalyst can be held high while suppressing a deterioration in fuel economy and preventing a sense of discomfort from being caused to the driver.

Furthermore, in the control apparatus, when the purification capacity of the catalyst is equal to or higher than the stop threshold correction threshold, a value equal to the reference engine stop threshold or a value larger than the reference engine stop threshold is set as the engine stop threshold. On the other hand, in the control apparatus, when the purification capacity of the catalyst is lower than the stop threshold correction threshold, a value smaller than the reference engine stop threshold is set as the engine stop threshold. Thus, when the necessity to stop operation of the internal combustion engine arises due to a decrease in the required power, the operation of the internal combustion engine is stopped later in the case where the purification capacity of the catalyst is lower than the stop threshold correction threshold than in the case where the purification capacity of the catalyst is equal to or higher than the stop threshold correction threshold. Then, as a result, the duration time of the operation of the internal combustion engine is prolonged. Thus, the temperature of the catalyst can be raised to a higher temperature, so that the purification capacity of the catalyst is enhanced.

Besides, when the required power decreases, the operation of the internal combustion engine is performed. Therefore, the operation of the internal combustion engine according to the invention, which is prolonged when the purification capacity of the catalyst is lower than the stop threshold correction threshold, is operation resulting from the continuation of the operation of the internal combustion engine that has already been performed, and is not the operation of the internal combustion engine that is performed as a result of the unnecessary start of the operation of the internal combustion engine. Thus, even if the duration time of the operation of the internal combustion engine is prolonged as a result of a state where the purification capacity of the catalyst is lower than the stop threshold correction threshold, a deterioration in fuel economy is suppressed, and a sense of discomfort is prevented from being caused to the driver of a vehicle in the case where the internal combustion engine according to the invention is mounted on the vehicle. From this point of view, according to the invention, the purification capacity of the catalyst can be held high while suppressing a deterioration in fuel economy and preventing a sense of discomfort from being caused to the driver.

Further, according to still another aspect of the invention, there is provided a control apparatus for a power unit that is equipped with an internal combustion engine and outputs a power. This control apparatus is equipped with a controller. The controller sets, as an engine start threshold, a threshold that concerns an output power as a power output from the power unit and is used to determine whether to start operation of the internal combustion engine or not, and sets, as an engine stop threshold, a threshold that concerns an output power and is used to determine whether to stop operation of the internal combustion engine or not. Then, the controller starts operation of the internal combustion engine when a required power as an output power required of the power unit during stop of operation of the internal combustion engine becomes equal to or larger than the engine start threshold, and stops operation of the internal combustion engine when the required power becomes equal to or smaller than the engine stop threshold during operation of the internal combustion engine.

Now, it should be noted in the control apparatus that the internal combustion engine is equipped with a catalyst that purifies components in exhaust gas discharged from a combustion chamber of the internal combustion engine. Besides, the controller obtains a reference engine start threshold that is an output power equal to or larger than zero and has been prepared in advance as a criterion for setting the engine start threshold; obtains a reference engine stop threshold that is an output power larger than zero and has been prepared in advance as a criterion for setting the engine stop threshold; and obtains a stop threshold correction threshold that is a threshold equal to or larger than zero and has been prepared in advance as a threshold which concerns a purification capacity of the catalyst and is used to determine whether to correct the reference engine stop threshold or not. Then, the controller sets a value smaller than the reference engine stop threshold as the engine stop threshold when the purification capacity of the catalyst is lower than the stop threshold correction threshold, sets a value equal to the reference engine stop threshold or a value larger than the reference engine stop threshold as the engine stop threshold when the purification capacity of the catalyst is equal to or higher than the stop threshold correction threshold, and sets a value equal to the reference engine start threshold as the engine start threshold regardless of the purification capacity of the catalyst.

It should be noted in the control apparatus that the engine start threshold that is set when the purification capacity of the catalyst is lower than the stop threshold correction threshold may be a value smaller than the reference engine stop threshold, and is not limited to a specific value. Accordingly, in the invention, the engine start threshold that is set when the purification capacity of the catalyst is lower than the stop threshold correction threshold may be, for example, a value that is smaller than the reference engine stop threshold by a certain value, a value that decreases as the purification capacity of the catalyst decreases with respect to the stop threshold correction threshold (i.e., this value is a value that monotonically decreases as the purification capacity of the catalyst decreases with respect to the stop threshold correction threshold), or a value that stepwise decreases as the purification capacity of the catalyst decreases with respect to the stop threshold correction threshold (i.e., this value is a value that stepwise decreases as the purification capacity of the catalyst decreases with respect to the stop threshold correction threshold).

Further, in the control apparatus, in the case where a value larger than the reference engine stop threshold is set as the engine stop threshold when the purification capacity of the catalyst is equal to or higher than the stop threshold correction threshold, the engine stop threshold may be a value equal to or larger than the reference engine stop threshold, and is not limited to a specific value. Accordingly, in the invention, the engine stop threshold that is set to a value larger than the reference engine stop threshold when the purification capacity of the catalyst is equal to or higher than the stop threshold correction threshold may be, for example, a value that is larger than the reference engine stop threshold by a certain value, a value that increases as the purification capacity of the catalyst increases with respect to the stop threshold correction threshold (i.e., this value is a value that monotonically increases as the purification capacity of the catalyst increases with respect to the stop threshold correction threshold), or a value that stepwise increases as the purification capacity of the catalyst increases with respect to the stop threshold correction threshold (i.e., this value is a value that stepwise increases as the purification capacity of the catalyst increases with respect to the stop threshold correction threshold).

The invention is advantageous in that the purification capacity of the catalyst can be held high while suppressing a deterioration in fuel economy and preventing a sense of discomfort from being caused to the driver. That is, in the control apparatus, when the purification capacity of the catalyst is equal to or higher than the stop threshold correction threshold, a value equal to the reference engine stop threshold or a value larger than the reference engine stop threshold is set as the engine stop threshold. On the other hand, in the control apparatus, when the purification capacity of the catalyst is lower than the stop threshold correction threshold, a value smaller than the reference engine stop threshold is set as the engine stop threshold. Accordingly, the engine stop threshold at the time when the purification capacity of the catalyst is lower than the stop threshold correction threshold is smaller than the engine stop threshold at the time when the purification capacity of the catalyst is equal to or higher than the stop threshold correction threshold. Thus, when the necessity to stop operation of the internal combustion engine arises due to a decrease in the required power, the operation of the internal combustion engine is stopped later in the case where the purification capacity of the catalyst is lower than the stop threshold correction threshold than in the case where the purification capacity of the catalyst is equal to or higher than the stop threshold correction threshold. Then, as a result, the duration time of the operation of the internal combustion engine is prolonged. Thus, the temperature of the catalyst can be raised to a higher temperature, so that the purification capacity of the catalyst is enhanced.

Besides, when the required power decreases, the operation of the internal combustion engine is performed. Therefore, the operation of the internal combustion engine according to the invention, which is prolonged when the purification capacity of the catalyst is lower than the stop threshold correction threshold, is operation resulting from the continuation of the operation of the internal combustion engine that has already been performed, and is not the operation of the internal combustion engine that is performed as a result of the unnecessary start of the operation of the internal combustion engine. Thus, even if the duration time of the operation of the internal combustion engine is prolonged as a result of a state where the purification capacity of the catalyst is lower than the stop threshold correction threshold, a deterioration in fuel economy is suppressed, and a sense of discomfort is prevented from being caused to the driver of a vehicle in the case where the internal combustion engine according to the invention is mounted on the vehicle. From this point of view, according to the invention, the purification capacity of the catalyst can be held high while suppressing a deterioration in fuel economy and preventing a sense of discomfort from being caused to the driver.

Further, in the control apparatus, the power unit may further be equipped with an electric motor. The controller may also utilize a power that is output from the electric motor, as part of a power that is output from the power unit when the required power is larger than zero.

Still further, in the control apparatus, the controller may also obtains an engine stop permission threshold that is a purification capacity of the catalyst which is lower than the stop threshold correction threshold and has been prepared in advance and that is used to determine whether operation of the internal combustion engine should be permitted to be stopped or not. Besides, the controller may also continue operation of the internal combustion engine even if the required power is equal to or smaller than the engine stop threshold while the purification capacity of the catalyst is equal to or lower than the engine stop permission threshold during the performance of operation of the internal combustion engine that is started for the first time after the purification capacity of the catalyst becomes equal to or lower than the engine stop permission threshold, and stop operation of the internal combustion engine when the required power becomes equal to or smaller than the engine stop threshold after the purification capacity of the catalyst becomes higher than the engine stop permission threshold.

According to the control apparatus as described above, there is an advantage in that the purification capacity of the catalyst can be made higher than the engine stop permission threshold at an early stage when the purification capacity of the catalyst becomes equal to or lower than an engine stop permission threshold that is smaller than the stop threshold correction threshold during the stop of the operation of the internal combustion engine. That is, if the operation of the internal combustion engine is always stopped when the required power becomes equal to or smaller than the engine stop threshold during the performance of the operation of the internal combustion engine that is started for the first time after the purification capacity of the catalyst becomes equal to or lower than the engine stop permission threshold during the stop of the operation of the internal combustion engine, the operation of the internal combustion engine may be stopped before the purification capacity of the catalyst becomes higher than the engine stop permission threshold. Besides, in this case, it takes a relatively long time until the purification capacity of the catalyst becomes higher than the engine stop permission threshold. However, in the invention, while the purification capacity of the catalyst is equal to or lower than the engine stop permission threshold during the stop of the operation of the internal combustion engine, the operation of the internal combustion engine is continued even if the required power becomes equal to or smaller than the engine stop threshold. For this reason, when the purification capacity of the catalyst becomes equal to or lower than the engine stop permission threshold during the stop of the operation of the internal combustion engine, the purification capacity of the catalyst can be made higher than the engine stop permission threshold at an early stage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
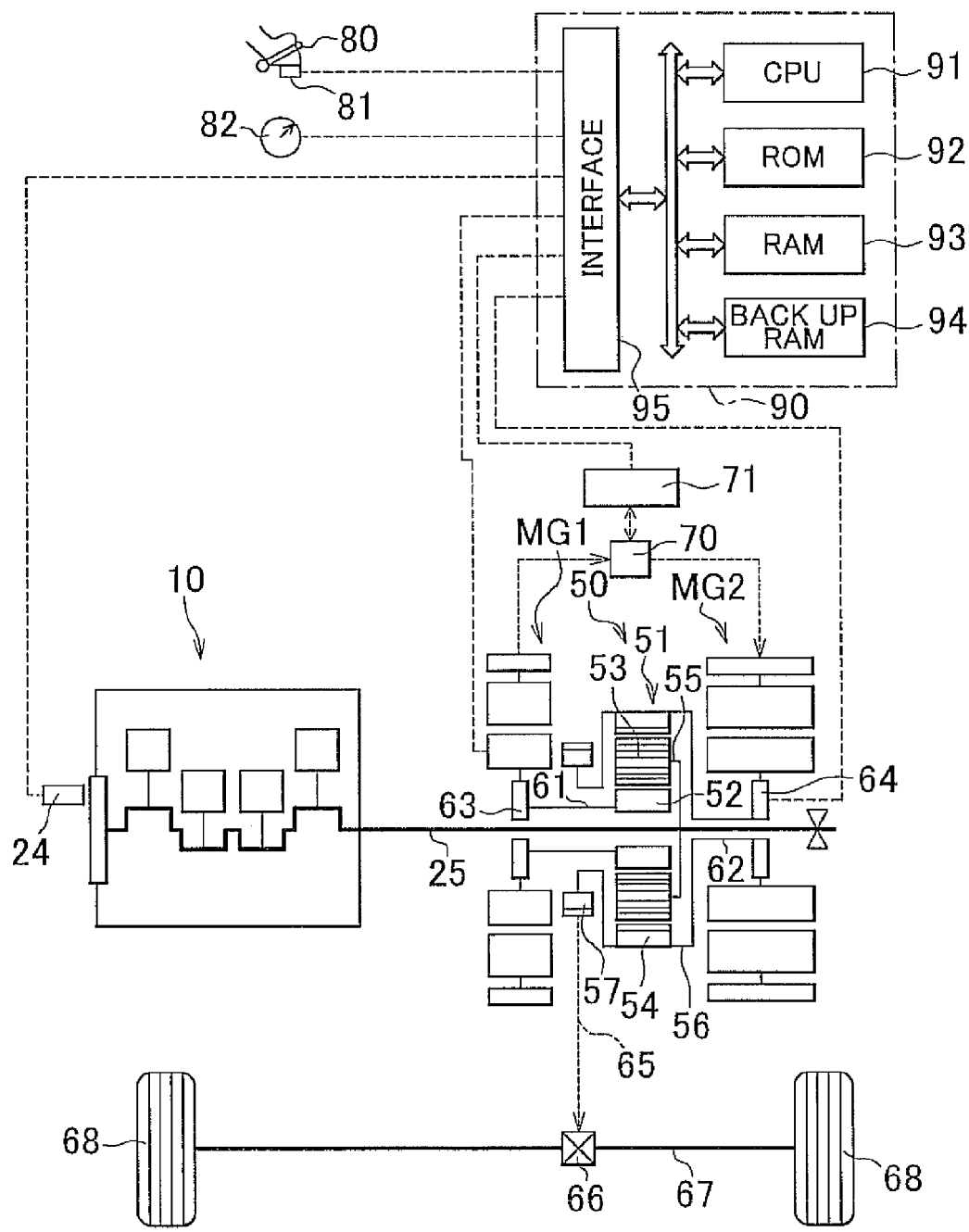
FIG. 1 is a view showing a hybrid vehicle that is equipped with a power unit to which a control apparatus according to the first embodiment of the invention is applied.

Hereinafter, the first embodiment of the invention will be described. A hybrid vehicle according to the first embodiment of the invention is shown in FIG. 1. In FIG. 1, generator motors (these generator motors will be referred to hereinafter as "a first generator motor" and "a second generator motor" respectively) are denoted by MG1 and MG2 respectively, an internal combustion engine is denoted by 10, a crank position sensor is denoted by 24, a power transfer mechanism is denoted by 50, an inverter is denoted by 70, a battery is denoted by 71, an accelerator pedal is denoted by 80, an accelerator pedal depression stroke sensor is denoted by 81, a tachometer is denoted by 82, and an electronic control unit is denoted by 90.

The electronic control unit 90 is constituted by a microcomputer. Further, the electronic control unit 90 has a microprocessor (a CPU) 91, a read only memory (a ROM) 92, a random access memory (a RAM) 93, a backup RAM 94, and an interface 95. These components, namely, the CPU 91, the ROM 92, the RAM 93, the backup RAM 94, and the interface 95 are connected to one another by a bidirectional bus.

Figure 2:
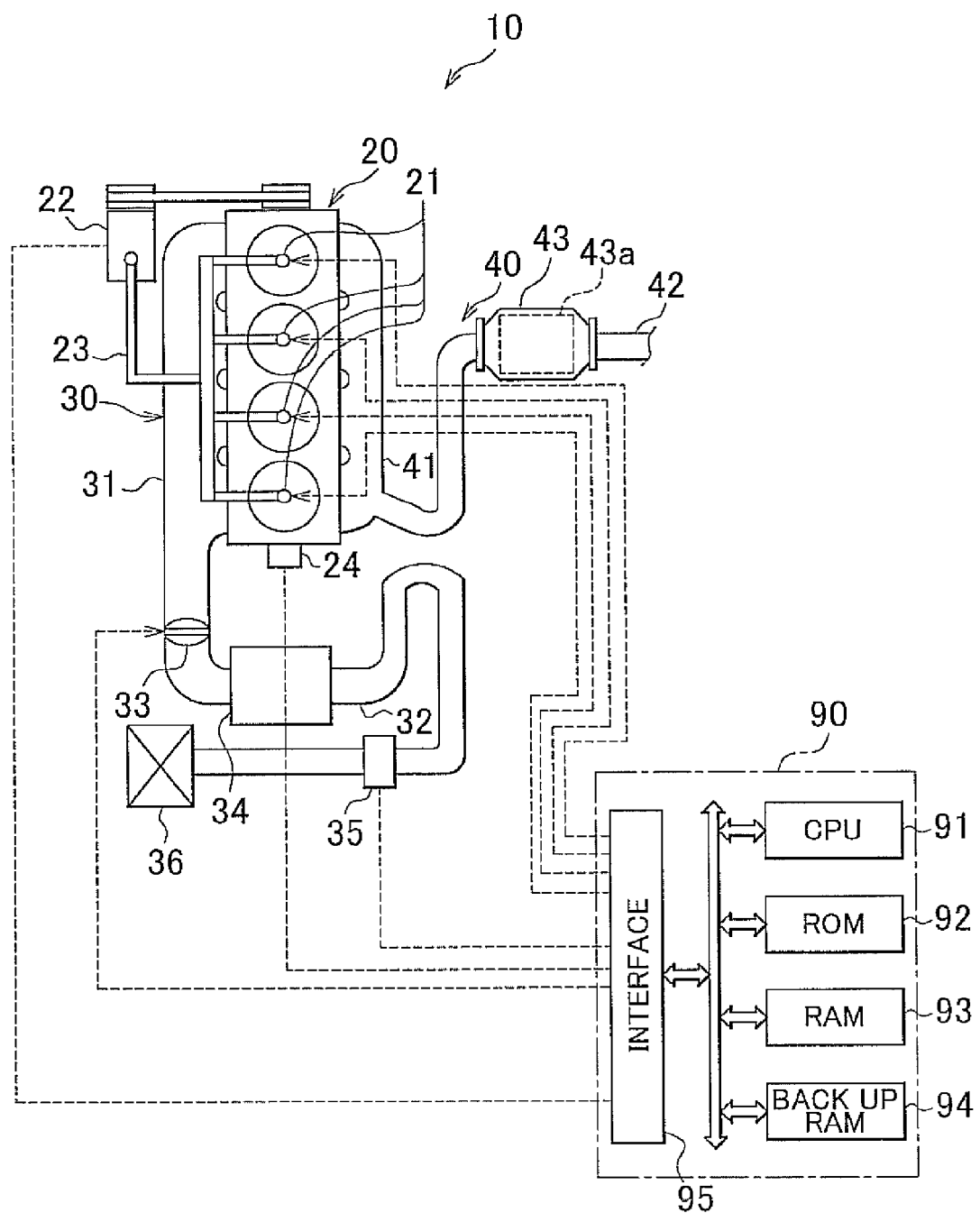
FIG. 2 is a view showing an internal combustion engine of the power unit according to the first embodiment of the invention.

FIG. 2 shows the details of the internal combustion engine 10. The internal combustion engine shown in FIG. 2 is a compression self-ignition internal combustion engine (a so-called diesel engine). In FIG. 2, a main body of the internal combustion engine 10 is denoted by 20, fuel injection valves are denoted by 21, a fuel pump is denoted by 22, a fuel supply passage is denoted by 23, an intake passage is denoted by 30, an intake manifold is denoted by 31, an intake pipe is denoted by 32, a throttle valve is denoted by 33, an intercooler is denoted by 34, an airflow meter is denoted by 35, an air cleaner is denoted by 36, an exhaust passage is denoted by 40, an exhaust manifold is denoted by 41, an exhaust pipe is denoted by 42, and a catalytic converter is denoted by 43. The intake passage 30 is composed of the intake manifold 31 and the intake pipe 32. The exhaust passage 40 is composed of the exhaust manifold 41 and the exhaust pipe 42.

The fuel injection valves 21 are mounted to the main body 20 of the internal combustion engine. The fuel pump 22 is connected to the fuel injection valves 21 via the fuel supply passage 23. The fuel pump 22 supplies high-pressure fuel to the fuel injection valves 21 via the fuel supply passage 23. Further, the fuel injection valves 21 are electrically connected to the interface 95 of the electronic control unit 90. The electronic control unit 90 supplies the fuel injection valves 21 with a command signal for causing the fuel injection valves 21 to inject fuel. Further, the fuel pump 22 is also electrically connected to the interface 95 of the electronic control unit 90. The electronic control unit 90 supplies the fuel pump 22 with a control signal for controlling the operation of the fuel pump 22 such that the pressure of fuel supplied from the fuel pump 22 to the fuel injection valves 21 is held at a predetermined pressure. It should be noted that the fuel injection valves 21 are mounted to the main body 20 of the internal combustion engine such that fuel injection holes of the fuel injection valves 21 are exposed to the interiors of combustion chambers respectively. Accordingly, when the command signal is supplied from the electronic control unit 90 to the fuel injection valves 21, the fuel injection valves 21 directly inject fuel into the combustion chambers respectively.

The intake manifold 31 branches off, at one end thereof, into a plurality of pipes. These branch pipes are connected respectively to intake ports (not shown), which are formed in a manner corresponding to the combustion chambers of the main body 20 of the internal combustion engine respectively. Further, the intake manifold 31 is connected, at the other end thereof, to one end of the intake pipe 32. The exhaust manifold 41 branches off, at one end thereof, into a plurality of pipes. These branch pipes are connected respectively to exhaust ports (not shown), which are formed in a manner corresponding to the combustion chambers of the main body 20 of the internal combustion engine respectively. Further, the exhaust manifold 41 is connected, at the other end thereof, to one end of the exhaust pipe 42.

The throttle valve 33 is arranged in the intake pipe 32. Further, when the opening degree of the throttle valve 33 (this opening degree will be referred to hereinafter as "a throttle valve opening degree") is changed, the flow passage area in the intake pipe 32 in a region where the throttle valve 33 is arranged changes. Thus, the amount of air passing through the throttle valve 33 changes, and hence, the amount of air sucked into the combustion chambers changes. An actuator (this actuator will be referred to hereinafter as "a throttle valve actuator") for changing the operation state of the throttle valve 33 (i.e., the throttle valve opening degree) is connected to the throttle valve 33. The throttle valve actuator is electrically connected to the interface 95 of the electronic control unit 90. The electronic control unit 90 supplies the throttle valve actuator with a control signal for driving the throttle valve actuator in such a manner as to control the throttle valve opening degree to a target throttle valve opening degree.

The intercooler 34 is arranged in the intake pipe 32 at a position upstream of the throttle valve 33. The intercooler 34 cools the air flowing thereinto.

The internal combustion engine 10 forms an mixture from the air sucked into the combustion chambers and the fuel injected from the fuel injection valves 21, causes this mixture to self-ignite through compression, and burns the fuel in the mixture. When the fuel burns in the combustion chambers, a torque is output to a crankshaft 25.

The airflow meter 35 is arranged in the intake pipe 32 at a position upstream of the intercooler 34. Further, the airflow meter 35 is electrically connected to the interface 95 of the electronic control unit 90. The airflow meter 35 outputs an output value corresponding to an amount of air passing therethrough. This output value is input to the electronic control unit 90. On the basis of this output value, the electronic control unit 90 calculates an amount of air passing through the airflow meter 35, and hence an amount of air sucked into the combustion chambers.

The crank position sensor 24 is arranged in the vicinity of an output shaft 25 of the internal combustion engine, namely, the crankshaft 25. Further, the crank position sensor 24 is electrically connected to the interface 95 of the electronic control unit 90. The crank position sensor 24 outputs an output value corresponding to a rotational phase of the crankshaft 25. This output value is input to the electronic control unit 90. On the basis of this output value, the electronic control unit 90 calculates an engine rotational speed (i.e., a rotational speed of the crankshaft 25 of the internal combustion engine).

The catalytic converter 43 is arranged in the exhaust pipe 42. Further, the catalytic converter 43 has a catalyst 43*a* therein. This catalyst 43 serves to purify specific components in the exhaust gas discharged from the combustion chambers. This catalyst 43 is, for example, a so-called NOx catalyst capable of purifying nitrogen oxides (NOx) in exhaust gas, or a so-called three-way catalyst capable of purifying nitrogen oxides, carbon monoxide (CO), and unburned hydrocarbons (HC) at the same time at a relatively high purification rate.

The power transfer 50 has a planetary gear train 51. The planetary gear train 51 has a sun gear 52, a pinion 53, and a ring gear 54. The pinion 53 is meshed with the sun gear 52, and is also meshed with the ring gear 54. The sun gear 52 is connected to a shaft of the first generator motor MG1 (this shaft will be referred to hereinafter as "a first shaft") 61. Accordingly, the first generator motor MG1 can be rotationally driven by a torque input from the sun gear 52 to the first generator motor MG1, and can output a torque to the sun gear 52. Besides, the first generator motor MG1 can generate an electric power by being rotationally driven by the torque input from the sun gear 52 to the first generator motor MG1. The ring gear 54 is connected to a shaft of the second generator motor MG2 (this shaft will be referred to hereinafter as "a second shaft") 62 via a ring gear carrier 56. Accordingly, the second generator motor MG2 can output a torque to the ring gear 54, and can be rotationally driven by a torque input from the ring gear 54 to the second generator motor MG2. Besides, the second generator motor MG2 can generate an electric power by being rotationally driven by the torque input from the ring gear 54 to the second generator motor MG2.

The pinion 53 is connected to the crankshaft 25 via a carrier 55. Accordingly, the pinion 53 is rotationally driven by a torque input from the crankshaft 25 to the pinion 53. Further, the pinion 53 is meshed with the sun gear 52 and the ring gear 54. Accordingly, when a torque is input from the pinion 53 to the sun gear 52, the sun gear 52 is rotationally driven by the torque. When a torque is input from the pinion 53 to the ring gear 54, the ring gear 54 is rotationally driven by the torque. On the contrary, when a torque is input from the sun gear 52 to the pinion 53, the pinion 53 is rotationally driven by the torque. When a torque is input from the ring gear 54 to the pinion 53, the pinion 53 is rotationally driven by the torque.

The ring gear 54 is connected to an output gear 57 via the ring gear carrier 56. Accordingly, the output gear 57 is rotationally driven by a torque input from the ring gear 54 to the output gear 57. The ring gear 54 is rotationally driven by a torque input from the output gear 57 to the ring gear 54.

Further, the first generator motor MG1 has a resolver 63 that outputs an output value corresponding to a rotational angle of the first generator motor MG1. This resolver 63 is connected to the interface 95 of the electronic control unit 90, and an output value of the resolver 63 is input to the electronic control unit 90. The electronic control unit 90 calculates a rotational speed of the first generator motor (this rotational speed will be referred to hereinafter as "a first MG rotational speed") on the basis of this output value. On the other hand, the second generator motor MG2 has a resolver 64 that outputs an output value corresponding to a rotational angle of the second generator motor. This resolver 64 is connected to the interface 95 of the electronic control unit 90, and an output value of the resolver 64 is input to the electronic control unit 90. The electronic control unit 90 calculates a rotational speed of the second generator motor (this rotational speed will be referred to hereinafter as "a second MG rotational speed") on the basis of this output value.

Further, the first generator motor MG1 is electrically connected to the battery 71 via the inverter 70. Accordingly, when the first generator motor MG1 generates an electric power, the electric power generated by the first generator motor MG1 (this electric power will be referred to hereinafter as "a first generated electric power") can be supplied to the battery 71 via the inverter 70. Further, the first generator motor MG1 can be rotationally driven by the electric power supplied from the battery 71. The first generator motor MG1 is configured such that the rotational speed thereof can be controlled by controlling a control torque that is applied to the first generator motor MG1 by the electric power supplied from the battery 71 (this control torque will be referred to hereinafter as "a first control torque").

Further, the second generator motor MG2 is electrically connected to the battery 71 via the inverter 70. Accordingly, the second generator motor MG2 can be rotationally driven by the electric power supplied from the battery 71. The rotational speed of the second generator motor MG2 can be controlled by controlling a control torque that is applied to the second generator motor MG2 by the electric power supplied from the battery 71 (this control torque will be referred to hereinafter as "a second control torque"). Further, when the second generator motor MG2 generates an electric power, the electric power generated by the second generator motor MG2 (this electric power will be referred to hereinafter as "a second generated electric power") can be supplied to the battery 71 via the inverter 70.

It should be noted that the first generated electric power can also be directly supplied to the second generator motor MG2, and that the second generated electric power can also be directly supplied to the first generator motor.

Further, the battery 71 is connected to the interface 95 of the electronic control unit 90. Besides, a battery storage amount (i.e., an amount of electric power stored in the battery 71) is input to the interface 95 of the electronic control unit 90. Further, the inverter 70 is also connected to the interface 95 of the electronic control unit 90. Besides, the amount of electric power supplied from the inverter 70 to the second generator motor MG2 and the amount of electric power supplied from the inverter 70 to the first generator motor MG1 are controlled in accordance with a command that is transmitted from the electronic control unit 90 via the interface 95.

Further, the output gear 57 is connected to a differential gear 66 via a gear train 65. The differential gear 66 is mounted to a drive shaft 67. Driving wheels 68 are mounted to the drive shaft 67 at both ends thereof respectively. Accordingly, a torque from the output gear 57 is transmitted to the driving wheels 68 via the gear train 65, the differential gear 66, and the drive shaft 67.

The accelerator pedal depression stroke sensor 81 is electrically connected to the interface 95 of the electronic control unit 90. The accelerator pedal depression stroke sensor 81 outputs an output value corresponding to a depression stroke of the accelerator pedal 80. This output value is input to the electronic control unit 90. On the basis of this output value, the electronic control unit 90 calculates a depression stroke of the accelerator pedal 80, and hence an output required of the power unit. It should be noted that the power unit according to the first embodiment of the invention is generally composed of the internal combustion engine 10, the first generator motor MG1, and the second generator motor MG2.

Next, the control of the power unit according to the first embodiment of the invention will be described. Incidentally, in the following description, "an output power" means "a power output from the power unit". "A required power" means "an output power that is required to be output from the power unit to the output gear". "A vehicle speed" means "a running speed of a hybrid vehicle". "Engine operation" means "the operation of the internal combustion engine". "An EV mode" means "a mode in which only the first generator motor is driven, or only the second generator motor is driven, or the first generator motor and the second generator motor are driven to output a power equivalent to the required power to the output gear". "An HV mode" means "a mode in which the internal combustion engine is operated while driving the first generator motor, or the internal combustion engine is operated while driving the second generator motor, or the internal combustion engine is operated while driving the first generator motor and the second generator motor to output a power equivalent to the required power to the output gear". "EV mode control" means "the control of the driving of the first generator motor, the driving of the second generator motor, and the operation of the internal combustion engine according to the EV mode". "HV mode control" means "the control of the driving of the first generator motor, the driving of the second generator motor, and the operation of the internal combustion engine according to the HV mode".

In the first embodiment of the invention, two modes, namely, the EV mode and the HV mode are prepared. Besides, a threshold concerning an output power, which is used to determine whether to start engine operation or not (i.e., whether to perform HV mode control or not), is set as an engine start threshold (the details of the setting of this engine start threshold will be described later). Further, a threshold concerning an output power, which is used to determine whether to stop engine operation or not (i.e., whether to perform EV mode control or not), is set as an engine stop threshold (the details of the setting of this engine stop threshold will be described later).

Besides, in the first embodiment of the invention, the required power is calculated on the basis of the accelerator pedal depression stroke and the vehicle speed. Then, when the required power becomes equal to or larger than the engine start threshold during the stop of engine operation, engine operation is started. That is, when the required power becomes equal to or larger than the engine start threshold during the performance of EV mode control, HV mode control is performed. On the other hand, when the required power becomes equal to or smaller than the engine stop threshold during the performance of engine operation, engine operation is stopped. That is, when the required power becomes equal to or smaller than the engine stop threshold during the performance of HV mode control, EV mode control is performed.

Next, the engine start threshold according to the first embodiment of the invention will be described. In the first embodiment of the invention, an output power larger than zero, which serves as a criterion for setting the engine start threshold, is prepared in advance as a reference engine start threshold. Further, a threshold concerning the purification capacity of the catalyst, which is used to determine whether to correct the reference engine start threshold or not, is prepared in advance as a start threshold correction threshold.

Besides, when the purification capacity of the catalyst is lower than the start threshold correction threshold, a value smaller than the reference engine start threshold is set as the engine start threshold. Then, the engine start threshold thus set is used to determine whether to start engine operation during the performance of EV mode control or not. That is, while the required power is smaller than the engine start threshold thus set during the performance of EV mode control, engine operation is not started. When the required power becomes equal to or larger than the engine start threshold thus set, engine operation is started.

On the other hand, when the purification capacity of the catalyst is equal to or higher than the start threshold correction threshold, a value equal to the reference engine start threshold is set as the engine start threshold. Then, the engine start threshold thus set is used to determine whether to start engine operation during the performance of EV mode control or not. That is, while the required power is smaller than the engine start threshold thus set during the performance of EV mode control, engine operation is not started. When the required power becomes equal to or larger than the engine start threshold thus set, engine operation is started.

Next, the engine stop threshold according to the first embodiment of the invention will be described. In the first embodiment of the invention, an output power equal to or larger than zero, which serves as a criterion for setting the engine stop threshold, is prepared in advance as a reference engine stop threshold.

Besides, a value equal to the reference engine stop threshold is set as the engine stop threshold regardless of the purification capacity of the catalyst. Then, the engine stop threshold thus set is used to determine whether to stop engine operation during the performance of HV mode control or not. That is, while the required power is equal to or larger than the engine stop threshold thus set during the performance of HV mode control, engine operation is not stopped. When the required power becomes smaller than the engine stop threshold thus set, engine operation is stopped.

It should be noted in the first embodiment of the invention that the engine start threshold that is set when the purification capacity of the catalyst is lower than the start threshold correction threshold may be a value smaller than the reference engine start threshold. Accordingly, for example, a value that is smaller than the reference engine start threshold by a certain value regardless of the purification capacity of the catalyst may be set as the engine start threshold, a value that decreases as the purification capacity of the catalyst decreases with respect to the start threshold correction threshold may be set as the engine start threshold (in this case, the set engine start threshold is a value that monotonically decreases as the purification capacity of the catalyst decreases with respect to the start threshold correction threshold), or a value that stepwise decreases as the purification capacity of the catalyst decreases with respect to the start threshold correction threshold may be set as the engine start threshold (in this case, the set engine start threshold is a value that stepwise decreases as the purification capacity of the catalyst decreases with respect to the start threshold correction threshold).

Further, in the first embodiment of the invention, the required power is calculated on the basis of the accelerator pedal depression stroke and the vehicle speed. However, when the amount of electric power with which the battery is charged becomes smaller than a permissible value, a power that is needed to trigger electric power generation driving of the first generator motor or electric power generation driving of the second generator motor with a view to supplying the battery with an electric power may be added to the required power that is calculated on the basis of the accelerator pedal depression stroke and the vehicle speed.

Further, in the first embodiment of the invention, another parameter equivalent to the purification capacity of the catalyst may be used instead of the purification capacity of the catalyst. For example, it is possible to mention, as this parameter, a so-called purification rate that is calculated on the basis of an amount (or a ratio) of specific components in the exhaust gas flowing out from the catalyst with respect to an amount (or a ratio) of the specific components in the exhaust gas flowing into the catalyst when those components in exhaust gas which are to be purified by the catalyst are referred to as "the specific components".

Further, in the first embodiment of the invention, the method of acquiring the purification capacity of the catalyst may be any method, and is not limited to a specific method. Accordingly, for example, the purification capacity of the catalyst may be acquired on the basis of an amount (or a ratio) of the specific components in the exhaust gas flowing out from the catalyst with respect to an amount (or a ratio) of the specific components in the exhaust gas flowing into the catalyst, may be acquired on the basis of a temperature of the catalyst, or may be acquired on the basis of a temperature of the internal combustion engine.

Incidentally, in the case where the purification capacity of the catalyst is acquired on the basis of the temperature of the catalyst, the catalyst may be provided with a temperature sensor that detects a temperature of the catalyst, and a temperature corresponding to an output value of the temperature sensor may be used as a temperature of the catalyst for acquiring the purification capacity of the catalyst. Further, in this case, a temperature of the catalyst that is estimated through calculation from various parameters concerning the operation state of the internal combustion engine (e.g., an amount of air sucked into the combustion chambers or an integrated value thereof, an amount of fuel injected from the fuel injection valves or an integrated value thereof, and the like) may be used as a temperature of the catalyst for acquiring the purification capacity of the catalyst.

Further, in the case where the purification capacity of the catalyst is acquired on the basis of the temperature of the internal combustion engine, the internal combustion engine may be provided with a temperature sensor that detects a temperature of a coolant for cooling the internal combustion engine, and a temperature corresponding to an output value of the temperature sensor may be used as a temperature of the internal combustion engine for acquiring the purification capacity of the catalyst. Still further, in this case, the internal combustion engine may be provided with a temperature sensor that detects a temperature of a lubricating oil for lubricating the constituent elements of the internal combustion engine, and a temperature corresponding to an output value of the temperature sensor may be used as a temperature of the internal combustion engine for acquiring the purification capacity of the catalyst. Still further, in this case, the internal combustion engine may be provided with a pressure sensor that detects a pressure of a lubricating oil for lubricating the constituent elements of the internal combustion engine, and a temperature of the internal combustion engine that is estimated on the basis of a pressure corresponding to an output value of the pressure sensor may be used as a temperature of the internal combustion engine for acquiring the purification capacity of the catalyst. Still further, in this case, the internal combustion engine may be provided with a pressure sensor that detects a combustion pressure in the combustion chambers, and a temperature of the internal combustion engine that is estimated on the basis of a pressure corresponding to an output value of the pressure sensor may be used as a temperature of the internal combustion engine for acquiring the purification capacity of the catalyst. Still further, in this case, each of the generator motors may be provided with a temperature sensor that detects a temperature of a lubricating oil for lubricating each of the generator motors, and a temperature of the internal combustion engine that is estimated on the basis of a temperature corresponding to an output value of the temperature sensor may be used as a temperature of the internal combustion engine for acquiring the purification capacity of the catalyst.

Further, in the first embodiment of the invention, the engine start threshold is set depending on whether or not the purification capacity of the catalyst is lower than the start threshold correction threshold, using the purification capacity itself of the catalyst. However, it may be estimated whether or not the purification capacity of the catalyst is lower than the start threshold correction threshold, a value smaller than the reference engine start threshold may be set as the engine start threshold when it is estimated that the purification capacity of the catalyst is lower than the start threshold correction threshold, and a value equal to the reference engine start threshold may be set as the engine start threshold when it is estimated that the purification capacity of the catalyst is equal to or higher than the start threshold correction threshold.

Incidentally, in the case where it is estimated whether or not the purification capacity of the catalyst is lower than the start threshold correction threshold, for example, it may be estimated that the purification capacity of the catalyst is lower than the start threshold correction threshold when engine operation is started for the first time after the stop of engine operation for a relatively long period, or it may be estimated that the purification capacity of the catalyst is lower than the start threshold correction threshold until engine operation is started a predetermined number of times after the stop of engine operation for a relatively long period.

Further, an example of the control of the engine torque, the first control torque, and the second control torque in HV mode control according to the first embodiment of the invention will be introduced below. It should be noted in the following description that "an engine torque" is "a torque output from the crankshaft of the internal combustion engine", that "an engine operation point" is "an operation point of the internal combustion engine or an operation state of the internal combustion engine that is prescribed by an engine torque and an engine rotational speed", that "a required output" is "an output required as an output that is output from the crankshaft of the internal combustion engine", that "an accelerator pedal depression stroke" is "a depression stroke of the accelerator pedal", and that "a fuel injection amount" is "an amount of fuel injected from the fuel injection valves".

In the first embodiment of the invention, an engine operation point at which the best fuel economy is achieved when the required output is output from the crankshaft is obtained in advance as an optimal engine operation point for each required output, through an experiment or the like. Then, these optimal engine operation points are plotted on a graph that is defined by the engine torque and the engine rotational speed, and a line that is formed by connecting these optimal engine operation points is obtained as an optimal engine operation line. Besides, this optimal engine operation line is stored in the electronic control unit.

Then, a required output is calculated during engine operation, and that one of the engine operation points on the optimal engine operation line which allows the internal combustion engine to output this required output thus calculated is selected. Then, an engine torque and an engine rotational speed that prescribe this selected engine operation point are set as a target engine torque and a target engine rotational speed respectively. Then, the fuel injection amount and the engine rotational speed are controlled such that the target engine torque thus set and the target engine rotational speed thus set are achieved.

Meanwhile, in the case where the second MG rotational speed is constant, when the first MG rotational speed changes, the engine rotational speed changes as well. In other words, the engine rotational speed can be controlled by controlling the first MG rotational speed. Besides, given that the first MG rotational speed is denoted by "NMG1", that the second MG rotational speed is denoted by "NMG2", that the engine rotational speed is denoted by "NE", and that the ratio of the number of teeth of the sun gear to the number of teeth of the ring gear (i.e., the number of teeth of the sun gear/the number of teeth of the ring gear) is denoted by "ρ", there is established a relationship of an equation 1 shown below between the first MG rotational speed and the engine rotational speed. Accordingly, given that a target first MG rotational speed is denoted by "TNMG1" and that a target engine rotational speed is denoted by "TNE", there is established a relationship of an equation 2 shown below between the target first MG rotational speed and the target engine rotational speed.

$$NMG1=(NE-NMG2)/\rho+NE \quad (1)$$

$$TNMG1=(TNE-NMG2)/\rho+TNE \quad (2)$$

Thus, in the first embodiment of the invention, the target first MG rotational speed TNMG1 is calculated from the equation (2) shown above, through the use of the target engine rotational speed TNE, which is set in accordance with the engine operation point that is selected in accordance with the required output, and the current second MG rotational speed NMG2. Then, a deviation of the current first MG rotational speed NMG1 from the target first MG rotational speed TNMG1 thus calculated (=TNMG1−NMG1) is calculated. Then, the first control torque is controlled such that the deviation thus calculated becomes equal to zero.

Meanwhile, given that the engine torque is denoted by "TQE", that the engine torque input to the ring gear (i.e., the driving wheels) (this engine torque will be referred to hereinafter as "a ring gear input engine torque") is denoted by "TQEr", and that the ratio of the number of teeth of the sun gear to the number of teeth of the ring gear (i.e., the number of teeth of the sun gear/the number of teeth of the ring gear) is denoted by "ρ", there is established a relationship of an equation 3 shown below between the ring gear input engine torque and the engine torque.

$$TQEr=1/(1+\rho)\times TQE \quad (3)$$

That is, the ring gear input engine torque TQEr is part of the engine torque TQE. Accordingly, the ring gear input engine torque TQEr is smaller than a required drive torque (i.e., a torque to be input to the driving wheels 68). Thus, in the first embodiment of the invention, the second control torque is controlled such that a torque equivalent to a difference between the required drive torque and the ring gear input engine torque TQEr is input from the second generator motor to the ring gear. In this manner, a torque equal to the required drive torque is input to the ring gear.

The first embodiment of the invention is advantageous in that the purification capacity of the catalyst can be held high while suppressing a deterioration in fuel economy (in other words, reducing the amount of fuel consumed by the internal combustion engine) and preventing a sense of discomfort from being caused to the driver of the hybrid vehicle. That is, in the first embodiment of the invention, when the purification capacity of the catalyst is equal to or higher than the start threshold correction threshold, a value equal to the reference engine start threshold is set as the engine start threshold. On the other hand, in the first embodiment of the invention, when the purification capacity of the catalyst is lower than the start threshold correction threshold, a value smaller than the reference engine start threshold is set as the engine start threshold. Accordingly, the engine start threshold at the time when the purification capacity of the catalyst is lower than the start threshold correction threshold is smaller than the engine start threshold at the time when the purification capacity of the catalyst is equal to or higher than the start threshold correction threshold. Thus, when the necessity to start engine operation arises due to an increase in the required power, engine operation is started earlier in the case where the purification capacity of the catalyst is lower than the start threshold correction threshold than in the case where the purification capacity of the catalyst is equal to or higher than the start threshold correction threshold. Then, as a result, the duration time of engine operation is prolonged. Thus, the temperature of the catalyst can be raised to a higher temperature, so that the purification capacity of the catalyst is enhanced.

Besides, when the required power increases, engine operation is started at any rate. Therefore, the start itself of engine operation according to the first embodiment of the invention at the time when the purification capacity of the catalyst is lower than the start threshold correction threshold is the start of engine operation that is necessary at any rate, and not the unnecessary start of engine operation, and is also the start of engine operation that is intended or envisaged by the driver. Thus, even if engine operation is started early as a result of a state where the purification capacity of the catalyst is lower than the start threshold correction threshold, a deterioration in fuel economy is suppressed, and a sense of discomfort is prevented from being caused to the driver. From this point of view, according to the first embodiment of the invention, the purification capacity of the catalyst can be held high while suppressing a deterioration in fuel economy and preventing a sense of discomfort from being caused to the driver.

It should be noted in the first embodiment of the invention that when the purification capacity of the catalyst is equal to or higher than the start threshold correction threshold, a value equal to the reference engine start threshold is set as the engine start threshold. Instead of this, however, when the purification capacity of the catalyst is equal to or higher than the start threshold correction threshold, a value larger than the reference engine start threshold may be set as the engine start threshold. This is advantageous in the following respect. That is, when a value larger than the reference engine start threshold is set as the engine start threshold, the timing at which engine operation is actually started is retarded in making an attempt to start engine operation. For this reason, the timing at which the temperature of the catalyst starts rising is retarded. However, in the case where the purification capacity of the catalyst is equal to or higher than the start threshold correction threshold, the purification capacity of the catalyst can be regarded as relatively high. That is, the temperature of the catalyst can be regarded as sufficiently high with respect to an activation temperature. In this case, even if the timing at which engine operation is actually started is retarded in making an attempt to start engine operation, and as a result, the timing at which the temperature of the catalyst starts rising is retarded, the catalyst can exert sufficiently high purification capacity, because the temperature of the catalyst is sufficiently high in first place. On the other hand, when the timing at which engine operation is actually started is retarded, the amount of consumed fuel decreases correspondingly, so that fuel economy is improved. Accordingly, since a value larger than the reference engine start threshold is set as the engine start threshold when the purification capacity of the catalyst is equal to or higher than the start threshold correction threshold, an advantage of making it possible to improve fuel economy while causing the catalyst to exert sufficiently high purification capacity is obtained.

Incidentally, in the case where a value larger than the reference engine start threshold is thus set as the engine start threshold when the purification capacity of the catalyst is equal to or higher than the start threshold correction threshold, a value that is larger than the reference engine start threshold by a certain value regardless of the purification capacity of the catalyst may be set as the engine start threshold, a value that increases as the purification capacity of the catalyst increases with respect to the start threshold correction threshold may be set as the engine start threshold (in this case, the set engine start threshold is a value that monotonically increases as the purification capacity of the catalyst increases with respect to the start threshold correction threshold), or a value that stepwise increases as the purification capacity of the catalyst increases with respect to the start threshold correction threshold may be set as the engine start threshold (in this case, the set engine start threshold is a value that stepwise increases as the purification capacity of the catalyst increases with respect to the start threshold correction threshold).

Next, an example of a routine for performing the control of the power unit according to the first embodiment of the invention will be described. An example of this routine is shown in FIG. 1. It should be noted that the routine of FIG. 3 is a routine that is executed every time a predetermined time elapses.

Figure 3:
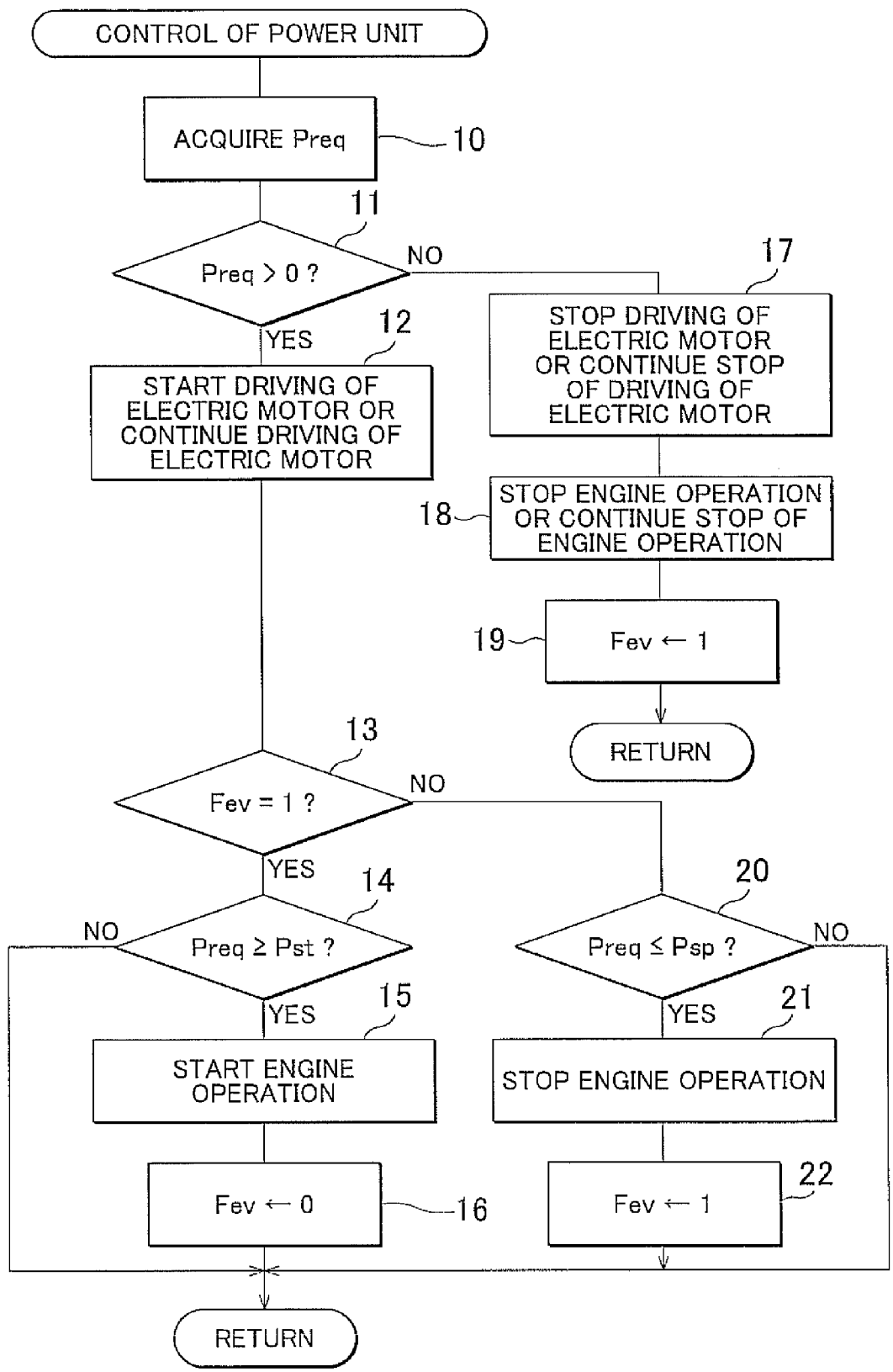
FIG. 3 is a view showing an example of a routine for performing control of the power unit according to the first embodiment of the invention.

When the routine of FIG. 3 is started, a required power Preq is acquired first in step 10. It is then determined in step 11 whether or not the required power Preq acquired in step 10 is larger than zero (Preq>0). In this case, when it is determined that Preq>0, the routine proceeds to step 12. On the other hand, when it is determined that Preq≤0, the routine proceeds to step 17.

When the routine proceeds to step 17 because it is determined in step 11 that Preq≤0, the power driving of the first generator motor is stopped in the case where the first generator motor is power-driven, the stop of the power driving of the first generator motor is continued in the case where the power driving of the first generator motor has already been stopped, the power driving of the second generator motor is stopped in the case where the second generator motor is power-driven, and the stop of the power driving of the second generator motor is continued in the case where the power driving of the second generator motor has already been stopped. Then in step 18, engine operation is stopped in the case where engine operation is performed, and the stop of engine operation is continued in the case where engine operation has already been stopped. Then in step 19, an EV mode control flag Fev is set (Fev←1), and the routine ends. It should be noted that the EV mode control flag Fev is a flag that is set when EV mode control is started or the outputting of a power from the power unit ends, and is reset when HV mode control is started.

When the routine proceeds to step 12 because it is determined in step 11 that Preq>0, one or both of the power driving of the first generator motor and the power driving of the second generator motor are started in accordance with the required power, or one or both of the power driving of the first generator motor and the power driving of the second generator motor are continued. It is then determined in step 13 whether or not the EV mode control flag Fev is set (Fev=1). When it is determined in step 13 that Fev=1 (i.e., when EV mode control is performed or when the routine has reached step 13 for the first time after the stop of the outputting of a power from the power unit), the routine proceeds to step 14. On the other hand, when it is determined that Fev≠1 (i.e., Fev=0) (i.e., when HV mode control is performed), the routine proceeds to step 20.

When the routine proceeds to step 14 because it is determined in step 13 that Fev=1, it is determined whether or not the required power acquired in step 10 is equal to or larger than an engine start threshold Pst (Preq≥Pst). In this case, when it is determined that Preq≥Pst, the routine proceeds to step 15. On the other hand, when it is determined that Preq<Pst, the routine ends.

When the routine proceeds to step 15 because it is determined in step 14 that Preq≥Pst, engine operation is started. Then in step 16, the EV mode control flag Fev is reset (Fev←0), and the routine ends.

When the routine proceeds to step 20 because it is determined in step 13 that Fev≠1, it is determined whether or not the required power Preq acquired in step 10 is equal to or smaller than an engine stop threshold Psp (Preq≤Psp). In this case, when it is determined that Preq≤Psp, the routine proceeds to step 21. On the other hand, when it is determined that Preq>Psp, the routine ends.

When the routine proceeds to step 21 because it is determined in step 20 that Preq≤Psp, engine operation is stopped. Then in step 22, the EV mode control flag Fev is set (Fev←1), and the routine ends.

Figure 4:
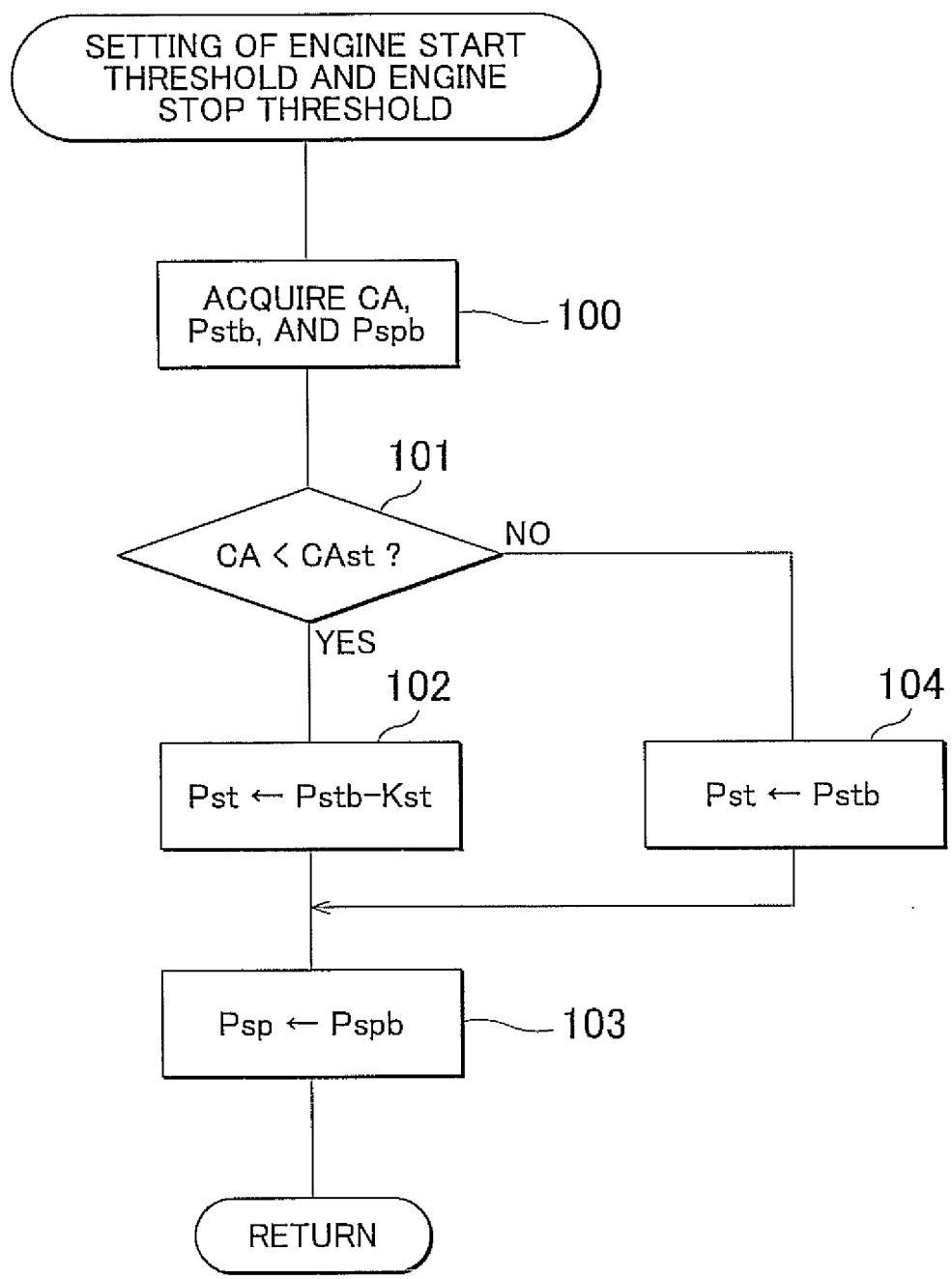
FIG. 4 is a view showing an example of a routine for setting an engine start threshold and an engine stop threshold according to the first embodiment of the invention.

Next, an example of a routine for setting the engine start threshold and the engine stop threshold according to the first embodiment of the invention will be described. An example of this routine is shown in FIG. 4. It should be noted that the routine of FIG. 4 is a routine that is executed every time a predetermined time elapses.

When the routine of FIG. 4 is started, a purification capacity CA of the catalyst, a reference engine start threshold Pstb, and a reference engine stop threshold Pspb are acquired first in step 100. It is then determined in step 101 whether or not the purification capacity CA of the catalyst acquired in step 100 is lower than a start threshold correction threshold CAst (CA<CAst). In this case, when it is determined that CA<CAst, the routine proceeds to step 102. On the other hand, when it is determined that CA≥CAst, the routine proceeds to step 104.

When the routine proceeds to step 102 because it is determined in step 101 that CA<CAst, a value that is obtained by subtracting a predetermined value Kst from the reference engine start threshold Pstb acquired in step 100 (Pstb−Kst) is set as the engine start threshold Pst, and the routine proceeds to step 103. On the other hand, when the routine proceeds to step 104 because it is determined in step 101 that CA≥CAst, the reference engine start threshold Pstb acquired in step 100 is set as the engine start threshold Pst, and the routine proceeds to step 103. In step 103, the reference engine stop threshold Pspb acquired in step 100 is set as the engine stop threshold Psp, and the routine ends.

Next, the second embodiment of the invention will be described. It should be noted that the configuration and control according to the second embodiment of the invention that will not be described hereinafter are identical to the configuration and control according to the first embodiment of the invention, or are the configuration and control that are naturally derived from the configuration and control according to the first embodiment of the invention in the light of the configuration and control according to the second embodiment of the invention.

The configuration of a hybrid vehicle according to the second embodiment of the invention is the same as the configuration of the hybrid vehicle according to the first embodiment of the invention shown in FIG. 1. Besides, in the second embodiment of the invention, EV mode control and HV mode control are performed in accordance with the required power as is the case with the first embodiment of the invention.

Next, the engine start threshold according to the second embodiment of the invention will be described. In the second embodiment of the invention, an output power equal to or larger than zero, which serves as a criterion for setting the engine start threshold, is prepared in advance as a reference engine start threshold. Then, a value equal to the reference engine start threshold is set as the engine start threshold regardless of the purification capacity of the catalyst. Then, the engine start threshold thus set is used to determine whether to start engine operation during the performance of EV mode control or not. That is, while the required power is smaller than the engine start threshold thus set during the performance of EV mode control, engine operation is not started. When the required power becomes equal to or larger than the engine start threshold thus set, engine operation is started.

Next, the engine stop threshold according to the second embodiment of the invention will be described. In the second embodiment of the invention, an output power larger than zero, which serves as a criterion for setting the engine stop threshold, is prepared in advance as a reference engine stop threshold. Further, a threshold concerning the purification capacity of the catalyst, which is used to determine whether to correct the reference engine stop threshold or not, is prepared in advance as a stop threshold correction threshold.

Besides, when the purification capacity of the catalyst is lower than the stop threshold correction threshold, a value smaller than the reference engine stop threshold is set as the engine stop threshold. Then, the engine stop threshold thus set is used to determine whether to stop engine operation during the performance of HV mode control or not. That is, while the required power is equal to or larger than the engine stop threshold thus set during the performance of HV mode control, engine operation is not stopped. When the required power becomes smaller than the engine stop threshold thus set, engine operation is stopped.

On the other hand, when the purification capacity of the catalyst is equal to or higher than the stop threshold correction threshold, a value equal to the reference engine stop threshold is set as the engine stop threshold. Then, the engine stop threshold thus set is used to determine whether to stop engine operation during the performance of HV mode control or not. That is, while the required power is equal to or larger than the engine stop threshold thus set during the performance of HV mode control, engine operation is not stopped. When the required power becomes smaller than the engine stop threshold thus set, engine operation is stopped.

It should be noted in the second embodiment of the invention that the engine stop threshold that is set when the purification capacity of the catalyst is lower than the stop threshold correction threshold may be a value smaller than the reference engine stop threshold. Accordingly, for example, a value that is smaller than the reference engine stop threshold by a certain value regardless of the purification capacity of the catalyst may be set as the engine stop threshold, a value that decreases as the purification capacity of the catalyst decreases with respect to the stop threshold correction threshold may be set as the engine stop threshold (in this case, the set engine stop threshold is a value that monotonically decreases as the purification capacity of the catalyst decreases with respect to the stop threshold correction threshold), or a value that stepwise decreases as the purification capacity of the catalyst decreases with respect to the stop threshold correction threshold may be set as the engine stop threshold (in this case, the set engine stop threshold is a value that stepwise decreases as the purification capacity of the catalyst decreases with respect to the stop threshold correction threshold).

The second embodiment of the invention is advantageous in that the purification capacity of the catalyst can be held high while suppressing a deterioration in fuel economy (in other words, reducing the amount of fuel consumed by the internal combustion engine) and preventing a sense of discomfort from being caused to the driver of the hybrid vehicle. That is, in the second embodiment of the invention, when the purification capacity of the catalyst is equal to or higher than the stop threshold correction threshold, a value equal to the reference engine stop threshold is set as the engine stop threshold. On the other hand, in the second embodiment of the invention, when the purification capacity of the catalyst is lower than the stop threshold correction threshold, a value smaller than the reference engine stop threshold is set as the engine stop threshold. Accordingly, the engine stop threshold at the time when the purification capacity of the catalyst is lower than the stop threshold correction threshold is smaller than the engine stop threshold at the time when the purification capacity of the catalyst is equal to or higher than the stop threshold correction threshold. Thus, when the necessity to stop engine operation arises due to a decrease in the required power, engine operation is stopped later in the case where the purification capacity of the catalyst is lower than the stop threshold correction threshold than in the case where the purification capacity of the catalyst is equal to or higher than the stop threshold correction threshold. Then, as a result, the duration time of engine operation is prolonged. Thus, the temperature of the catalyst can be raised to a higher temperature, so that the purification capacity of the catalyst is enhanced.

Besides, when the required power decreases, engine operation is performed. Therefore, engine operation according to the second embodiment of the invention, which is prolonged when the purification capacity of the catalyst is lower than the stop threshold correction threshold, is operation resulting from the continuation of engine operation that has already been performed, and is not engine operation that is performed as a result of the unnecessary start of engine operation. Thus, even if the duration time of engine operation is prolonged as a result of a state where the purification capacity of the catalyst is lower than the stop threshold correction threshold, a deterioration in fuel economy is suppressed, and a sense of discomfort is prevented from being caused to the driver. From this point of view, according to the second embodiment of the invention, the purification capacity of the catalyst can be held high while suppressing a deterioration in fuel economy and preventing a sense of discomfort from being caused to the driver.

It should be noted in the second embodiment of the invention that when the purification capacity of the catalyst is equal to or higher than the stop threshold correction threshold, a value equal to the reference engine stop threshold is set as the engine stop threshold. Instead of this, however, when the purification capacity of the catalyst is equal to or higher than the stop threshold correction threshold, a value larger than the reference engine stop threshold may be set as the engine stop threshold. This is advantageous in the following respect. That is, when a value larger than the reference engine stop threshold is set as the engine stop threshold, the timing at which engine operation is actually stopped is advanced in making an attempt to stop engine operation. For this reason, the timing at which the temperature of the catalyst stops rising is advanced. However, in the case where the purification capacity of the catalyst is equal to or higher than the stop threshold correction threshold, the purification capacity of the catalyst can be regarded as relatively high. That is, the temperature of the catalyst can be regarded as sufficiently high with respect to an activation temperature. In this case, even if the timing at which engine operation is actually stopped is advanced in making an attempt to stop engine operation, and as a result, the timing at which the temperature of the catalyst stops rising is advanced, the catalyst can exert sufficiently high purification capacity, because the temperature of the catalyst is sufficiently high in first place. On the other hand, when the timing at which engine operation is actually stopped is advanced, the amount of consumed fuel decreases correspondingly, so that fuel economy is improved. Accordingly, since a value larger than the reference engine stop threshold is set as the engine stop threshold when the purification capacity of the catalyst is equal to or higher than the stop threshold correction threshold, an advantage of making it possible to improve fuel economy while causing the catalyst to exert sufficiently high purification capacity is obtained.

Incidentally, in the case where a value larger than the reference engine stop threshold is set as the engine stop threshold when the purification capacity of the catalyst is equal to or higher than the stop threshold correction threshold as described above, a value that is larger than the reference engine stop threshold by a certain value regardless of the purification capacity of the catalyst may be set as the engine stop threshold, a value that increases as the purification capacity of the catalyst increases with respect to the stop threshold correction threshold may be set as the engine stop threshold (in this case, the set engine stop threshold is a value that monotonically increases as the purification capacity of the catalyst increases with respect to the stop threshold correction threshold), or a value that stepwise increases as the purification capacity of the catalyst increases with respect to the stop threshold correction threshold may be set as the engine stop threshold (in this case, the set engine stop threshold is a value that stepwise increases as the purification capacity of the catalyst increases with respect to the stop threshold correction threshold).

Figure 5:
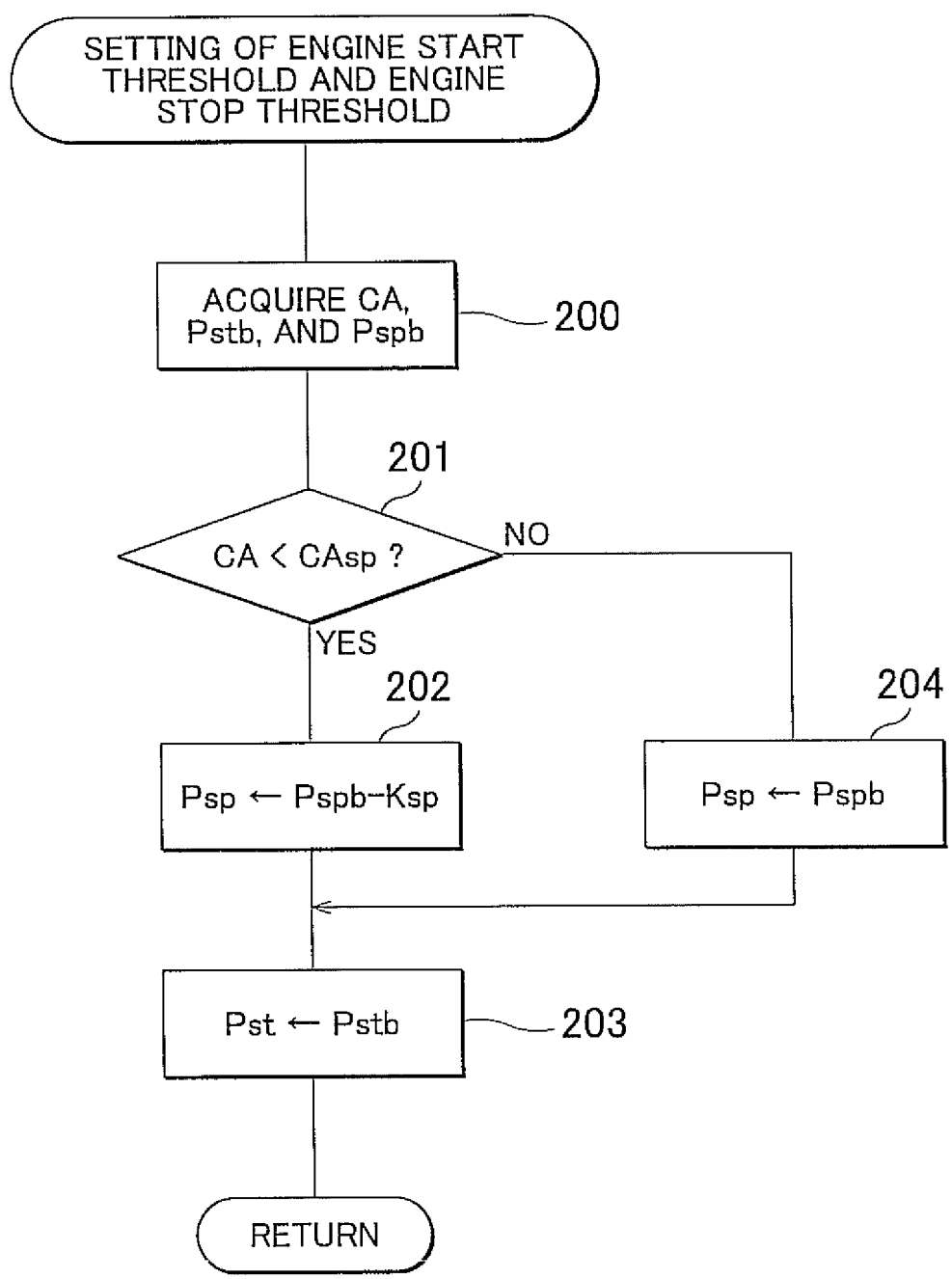
FIG. 5 is a view showing an example of a routine for setting an engine start threshold and an engine stop threshold according to the second embodiment of the invention.

Next, an example of a routine for setting the engine start threshold and the engine stop threshold according to the second embodiment of the invention will be described. An example of this routine is shown in FIG. 5. It should be noted that the routine of FIG. 5 is a routine that is executed every time a predetermined time elapses. Further, the routine shown in FIG. 3 can be adopted as a routine for performing the control of the power unit according to the second embodiment of the invention.

When the routine of FIG. 5 is started, the purification capacity CA of the catalyst, the reference engine start threshold Pstb, and the reference engine stop threshold Pspb are acquired first in step 200. It is then determined in step 201 whether or not the purification capacity CA of the catalyst acquired in step 200 is lower than a stop threshold correction threshold CAsp (CA<CAsp). In this case, when it is determined that CA<CAsp, the routine proceeds to step 202. On the other hand, when it is determined that CA≥CAsp, the routine proceeds to step 204.

When the routine proceeds to step 202 because it is determined in step 201 that CA<CAsp, a value that is obtained by subtracting a predetermined value Ksp from the reference engine stop threshold Pspb acquired in step 200 (Pspb−Ksp) is set as the engine stop threshold Psp, and the routine proceeds to step 203. On the other hand, when the routine proceeds to step 204 because it is determined in step 201 that CA≥CAsp, the reference engine stop threshold Pspb acquired in step 200 is set as the engine stop threshold Psp, and the routine proceeds to step 203. In step 203, the reference engine start threshold Pstb acquired in step 200 is set as the engine start threshold Pst, and the routine ends.

Next, the third embodiment of the invention will be described. It should be noted that the configuration and control according to the third embodiment of the invention that will not be described hereinafter are identical to the configuration and control according to the first embodiment of the invention or the second embodiment of the invention, or are the configuration and control that are naturally derived from the configuration and control according to the first embodiment of the invention or the second embodiment of the invention in the light of the configuration and control according to the third embodiment of the invention.

The configuration of a hybrid vehicle according to the third embodiment of the invention is the same as the configuration of the hybrid vehicle according to the first embodiment of the invention shown in FIG. 1. Besides, in the third embodiment of the invention, EV mode control and HV mode control are performed in accordance with the required power as is the case with the first embodiment of the invention.

Next, the engine start threshold according to the third embodiment of the invention will be described. In the third embodiment of the invention, as is the case with the first embodiment of the invention, an output power larger than zero, which serves as a criterion for setting the engine start threshold, is prepared in advance as a reference engine start threshold. Further, as is the case with the first embodiment of the invention, a threshold concerning the purification capacity of the catalyst, which is used to determine whether to correct the reference engine start threshold or not, is prepared in advance as a start threshold correction threshold.

Besides, as is the case with the first embodiment of the invention, when the purification capacity of the catalyst is lower than the start threshold correction threshold, a value smaller than the reference engine start threshold is set as the engine start threshold. Then, the engine start threshold thus set is used to determine whether to start engine operation during the performance of EV mode control or not. That is, while the required power is smaller than the engine start threshold thus set during the performance of EV mode control, engine operation is not started. When the required power becomes equal to or larger than the engine start threshold thus set, engine operation is started.

On the other hand, as is the case with the first embodiment of the invention, when the purification capacity of the catalyst is equal to or higher than the start threshold correction threshold, a value equal to the reference engine start threshold is set as the engine start threshold. Then, the engine start threshold thus set is used to determine whether to start engine operation during the performance of EV mode control or not. That is, while the required power is smaller than the engine start threshold thus set during the performance of EV mode control, engine operation is not started. When the required power becomes equal to or larger than the engine start threshold thus set, engine operation is started.

Next, the engine stop threshold according to the third embodiment of the invention will be described. In the third embodiment of the invention, as is the case with the second embodiment of the invention, an output power larger than zero, which serves as a criterion for setting the engine stop threshold, is prepared in advance as a reference engine stop threshold. Further, as is the case with the second embodiment of the invention, a threshold concerning the purification capacity of the catalyst, which is used to determine whether to correct the reference engine stop threshold or not, is prepared in advance as a stop threshold correction threshold.

Besides, as is the case with the second embodiment of the invention, when the purification capacity of the catalyst is lower than the stop threshold correction threshold, a value smaller than the reference engine stop threshold is set as the engine stop threshold. Then, the engine stop threshold thus set is used to determine whether to stop engine operation during the performance of HV mode control or not. That is, while the required power is equal to or larger than the engine stop threshold thus set during the performance of HV mode control, engine operation is not stopped. When the required power becomes smaller than the engine stop threshold thus set, engine operation is stopped.

On the other hand, as is the case with the second embodiment of the invention, when the purification capacity of the catalyst is equal to or higher than the stop threshold correction threshold, a value equal to the reference engine stop threshold or a value larger than the reference engine stop threshold is set as the engine stop threshold. Then, the engine stop threshold thus set is used to determine whether to stop engine operation during the performance of HV mode control or not. That is, while the required power is equal to or larger than the engine stop threshold thus set during the performance of HV mode control, engine operation is not stopped. When the required power becomes smaller than the engine stop threshold thus set, engine operation is stopped.

It should be noted in the third embodiment of the invention that the engine start threshold that is set when the purification capacity of the catalyst is lower than the start threshold correction threshold may be a value smaller than the reference engine start threshold, as is the case with the first embodiment of the invention. Further, in the third embodiment of the invention, the engine stop threshold that is set when the purification capacity of the catalyst is lower than the stop threshold correction threshold may be a value smaller than the reference engine stop threshold, as is the case with the second embodiment of the invention.

Further, in the third embodiment of the invention, the start threshold correction threshold and the stop threshold correction threshold may be equal to each other, or may be different from each other.

For a reason similar to the reason described in relation to the first embodiment of the invention and the second embodiment of the invention, the third embodiment of the invention is advantageous in that the purification capacity of the catalyst can be held high while suppressing a deterioration in fuel economy (in other words, reducing the amount of fuel consumed by the internal combustion engine) and preventing a sense of discomfort from being caused to the driver of the hybrid vehicle. Furthermore, in the third embodiment of the invention, a value smaller than the reference engine start threshold is set as the engine start threshold when the purification capacity of the catalyst is lower than the start threshold correction threshold, and a value smaller than the reference engine stop threshold is set as the engine stop threshold when the purification capacity of the catalyst is lower than the stop threshold correction threshold. Therefore, the start of engine operation is advanced, and the stop of engine operation is retarded. Thus, the third embodiment of the invention achieves an effect of making it possible to hold the purification capacity of the catalyst high while more reliably suppressing a deterioration in fuel economy and more reliably preventing a sense of discomfort from being caused to the driver than in the first embodiment of the invention and the second embodiment of the invention.

Figure 6:
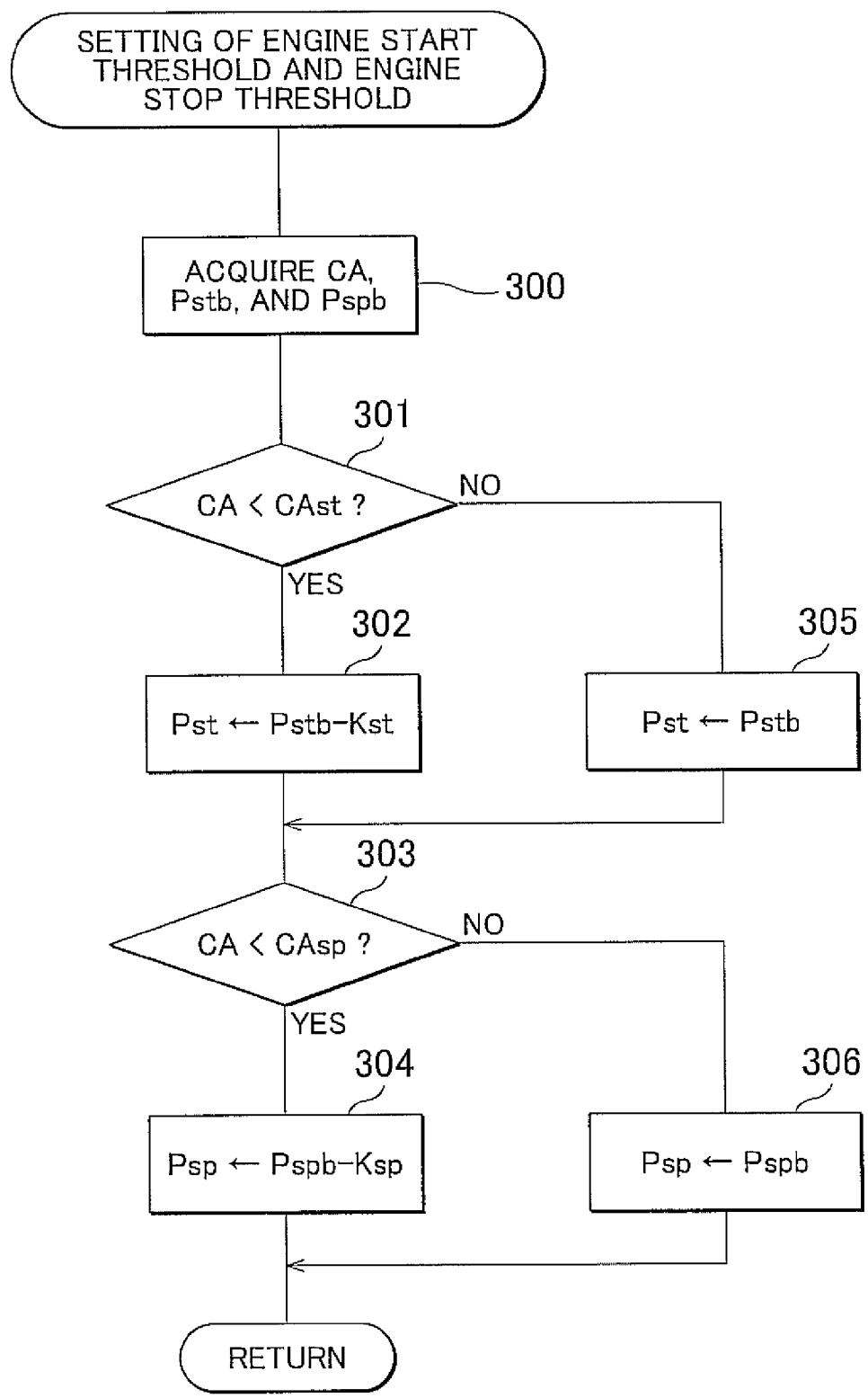
FIG. 6 is a view showing an example of a routine for setting an engine start threshold and an engine stop threshold according to the third embodiment of the invention.

Next, an example of a routine for setting the engine start threshold and the engine stop threshold according to the third embodiment of the invention will be described. An example of this routine is shown in FIG. 6. It should be noted that the routine of FIG. 6 is a routine that is executed every time a predetermined time elapses. Further, the routine shown in FIG. 3 can be adopted as a routine for performing the control of the power unit according to the third embodiment of the invention.

When the routine of FIG. 6 is started, the purification capacity CA of the catalyst, the reference engine start threshold Pstb, and the reference engine stop threshold Pspb are acquired first in step 300. It is then determined in step 301 whether or not the purification capacity CA of the catalyst acquired in step 300 is lower than the start threshold correction threshold CAst (CA<CAst). In this case, when it is determined that CA<CAst, the routine proceeds to step 302. On the other hand, when it is determined that CA≥CAst, the routine proceeds to step 305.

When the routine proceeds to step 302 because it is determined in step 301 that CA<CAst, a value that is obtained by subtracting the predetermined value Kst from the reference engine start threshold Pstb acquired in step 300 (Pstb−Kst) is set as the engine start threshold Pst, and the routine proceeds to step 303. On the other hand, when the routine proceeds to step 305 because it is determined in step 301 that CA≥CAst, the reference engine start threshold Pstb acquired in step 300 is set as the engine start threshold Pst, and the routine proceeds to step 303.

It is determined in step 303 whether or not the purification capacity CA of the catalyst acquired in step 300 is lower than the stop threshold correction threshold CAsp (CA<CAsp). In this case, when it is determined that CA<CAsp, the routine proceeds to step 304. On the other hand, when it is determined that CA≥CAsp, the routine proceeds to step 306.

When the routine proceeds to step 304 because it is determined in step 303 that CA<CAsp, a value that is obtained by subtracting the predetermined value Ksp from the reference engine stop threshold Pspb acquired in step 300 (Pspb−Ksp) is set as the engine stop threshold Psp, and the routine ends. On the other hand, when the routine proceeds to step 306 because it is determined in step 303 that CA≥CAsp, the reference engine stop threshold Pspb acquired in step 300 is set as the engine stop threshold Psp, and the routine ends.

Next, the fourth embodiment of the invention will be described. It should be noted that the configuration and control according to the fourth embodiment of the invention that will not be described hereinafter are identical to the configuration and control according to the first embodiment of the invention, or are the configuration and control that are naturally derived from the configuration and control according to the first embodiment of the invention in the light of the configuration and control according to the fourth embodiment of the invention.

The control of the power unit according to the fourth embodiment of the invention will be described. In the fourth embodiment of the invention, a purification capacity of the catalyst that is lower than the aforementioned stop threshold correction threshold is prepared as an engine stop permission threshold that is used to determine whether to permit the operation of the internal combustion engine to be stopped or not.

Besides, while the purification capacity of the catalyst is equal to or lower than the engine stop permission threshold during the performance of engine operation that is started for the first time after the purification capacity of the catalyst becomes equal to or lower than the engine stop permission threshold (i.e., during the performance of HV mode control), engine operation is prohibited from being stopped, and hence is continued (in other words, the performance of HV mode control is continued), even if the required power is equal to or smaller than the engine stop threshold. That is, while the purification capacity of the catalyst is equal to or lower than the engine stop permission threshold during the performance of engine operation that is performed for the first time after the purification capacity of the catalyst becomes equal to or lower than the engine stop permission threshold, engine operation is continued regardless of the required power.

Then, when the purification capacity of the catalyst becomes higher than the engine stop permission threshold, engine operation is permitted to be stopped. Accordingly, when the required power becomes equal to or smaller than the engine stop threshold after the purification capacity of the catalyst becomes higher than the engine stop permission threshold, engine operation is stopped (i.e., EV mode control is performed). It should be noted that after the purification capacity of the catalyst becomes higher than the engine stop permission threshold, the same control of the power unit as the control of the power unit according to the first embodiment of the invention, the second embodiment of the invention, or the third embodiment of the invention is performed. That is, after the purification capacity of the catalyst becomes higher than the engine stop permission threshold, EV mode control or HV mode control is performed in accordance with the required power.

It should be noted in the fourth embodiment of the invention that the engine stop permission threshold, which is a threshold concerning the purification capacity of the catalyst, is used to determine whether to permit engine operation to be stopped or not. Instead of this, however, a duration time of the stop of engine operation during which the purification capacity of the catalyst is highly likely to become equal to or lower than the engine stop permission threshold may be used. In this case, for example, the duration time of the stop of engine operation during which the purification capacity of the catalyst is highly likely to become equal to or lower than the engine stop permission threshold is set as the engine stop permission threshold. Then, during the performance of engine operation that is started for the first time after the duration time of the stop of engine operation becomes equal to or longer than the engine stop permission threshold, until a predetermined time elapses from a time point when the engine operation is started, the engine operation is prohibited from being stopped, and hence is continued, even if the required power is equal to or smaller than the engine stop threshold. Then, when the predetermined time elapses from the time point when the engine operation is started, the engine operation is permitted to be stopped. Accordingly, when the required power becomes equal to or smaller than the engine stop threshold after the predetermined time elapses from the time point when the engine operation is started, the engine operation is stopped.

In addition to the advantages described in relation to the first to third embodiments of the invention, the fourth embodiment of the invention is advantageous in that the purification capacity of the catalyst can be made higher than the engine stop permission threshold at an early stage when the purification capacity of the catalyst becomes equal to or lower than an engine stop permission threshold that is smaller than the stop threshold correction threshold during the stop of engine operation (i.e., when the purification capacity of the catalyst has relatively greatly decreased). That is, if engine operation is always stopped when the required power becomes equal to or smaller than the engine stop threshold during the performance of engine operation that is started for the first time after the purification capacity of the catalyst becomes equal to or lower than the engine stop permission threshold during the stop of engine operation, engine operation may be stopped before the purification capacity of the catalyst becomes higher than the engine stop permission threshold. Besides, in this case, it takes a relatively long time until the purification capacity of the catalyst becomes higher than the engine stop permission threshold. However, in the fourth embodiment of the invention, while the purification capacity of the catalyst is equal to or lower than the engine stop permission threshold during the stop of engine operation, engine operation is continued even if the required power becomes equal to or smaller than the engine stop threshold. For this reason, when the purification capacity of the catalyst becomes equal to or lower than the engine stop permission threshold during the stop of engine operation, the purification capacity of the catalyst can be made higher than the engine stop permission threshold at an early stage.

Figure 7:
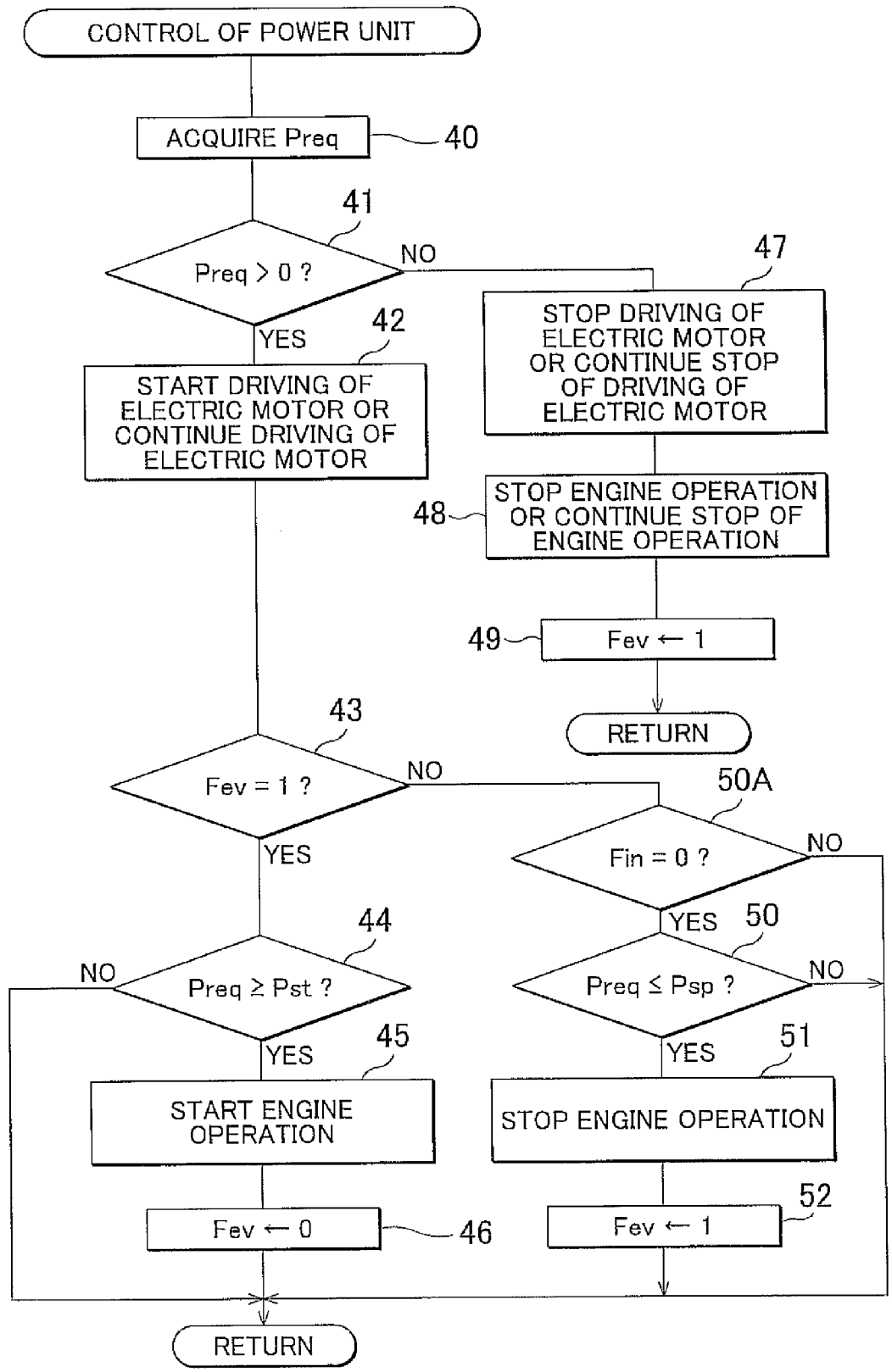
FIG. 7 is a view showing an example of a routine for performing control of a power unit according to the fourth embodiment of the invention.

Next, an example of a routine for performing the control of the power unit according to the fourth embodiment of the invention will be described. An example of this routine is shown in FIG. 7. It should be noted that the routine of FIG. 7 is a routine that is executed every time a predetermined time elapses.

When the routine of FIG. 7 is started, the required power Preq is acquired first in step 40. It is then determined in step 41 whether or not the required power Preq acquired in step 40 is larger than zero (Preq>0). In this case, when it is determined that Preq>0, the routine proceeds to step 42. On the other hand, when it is determined that Preq≤0, the routine proceeds to step 47.

When the routine proceeds to step 47 because it is determined in step 41 that Preq≤0, the power driving of the first generator motor is stopped in the case where the first generator motor is power-driven, the stop of the power driving of the first generator motor is continued in the case where the power driving of the first generator motor has already been stopped, the power driving of the second generator motor is stopped in the case where the second generator motor is power-driven, and the stop of the power driving of the second generator motor is continued in the case where the power driving of the second generator motor has already been stopped. Then in step 48, engine operation is stopped in the case where engine operation is performed, and the stop of engine operation is continued in the case where engine operation has already been stopped. Then in step 49, the EV mode control flag Fev is set (Fev←1), and the routine ends. It should be noted that the EV mode control flag Fev is a flag that is set when EV mode control is started or the outputting of a power from the power unit ends, and is reset when HV mode control is started.

When the routine proceeds to step 42 because it is determined in step 41 that Preq>0, one or both of the power driving of the first generator motor and the power driving of the second generator motor are started in accordance with the required power, or one or both of the power driving of the first generator motor and the power driving of the second generator motor are continued. It is then determined in step 43 whether or not the EV mode control flag Fev is set (Fev=1). When it is determined in step 43 that Fev=1 (i.e., when EV mode control is performed or when the routine has reached step 43 for the first time after the stop of the outputting of a power from the power unit), the routine proceeds to step 44. On the other hand, when it is determined that Fev≠1 (i.e., Fev=0) (i.e., when HV mode control is performed), the routine proceeds to step 50A.

When the routine proceeds to step 44 because it is determined in step 43 that Fev=1, it is determined whether or not the required power acquired in step 40 is equal to or larger than the engine start threshold Pst (Preq≥Pst). In this case, when it is determined that Preq≥Pst, the routine proceeds to step 45. On the other hand, when it is determined that Preq<Pst, the routine ends.

When the routine proceeds to step 45 because it is determined in step 44 that Preq≥Pst, engine operation is started. Then in step 46, the EV mode control flag Fev is reset (Fev←0), and the routine ends.

When the routine proceeds to step 50A because it is determined in step 43 that Fev≠1, it is determined whether or not an engine operation continuation flag Fin is reset (Fin=0). The engine operation continuation flag Fin is a flag that indicates whether to prohibit engine operation from being stopped and continue engine operation or not. The engine operation continuation flag Fin is a flag that is set in step 62 of FIG. 8 and reset in step 63 of FIG. 8. When it is determined in step 50A that Fin=0, the routine proceeds to step 50. On the other hand, when it is determined that Fin≠0, the routine ends.

When the routine proceeds to step 50 because it is determined in step 50A that Fin=0, it is determined whether or not the required power Preq acquired in step 40 is equal to or smaller than the engine stop threshold Psp (Preq≤Psp). In this case, when it is determined that Preq≤Psp, the routine proceeds to step 51. On the other hand, when it is determined that Preq>Psp, the routine ends.

When the routine proceeds to step 51 because it is determined in step 50 that Preq≤Psp, engine operation is stopped. Then in step 52, the EV mode control flag Fev is set (Fev←1), and the routine ends.

Figure 8:
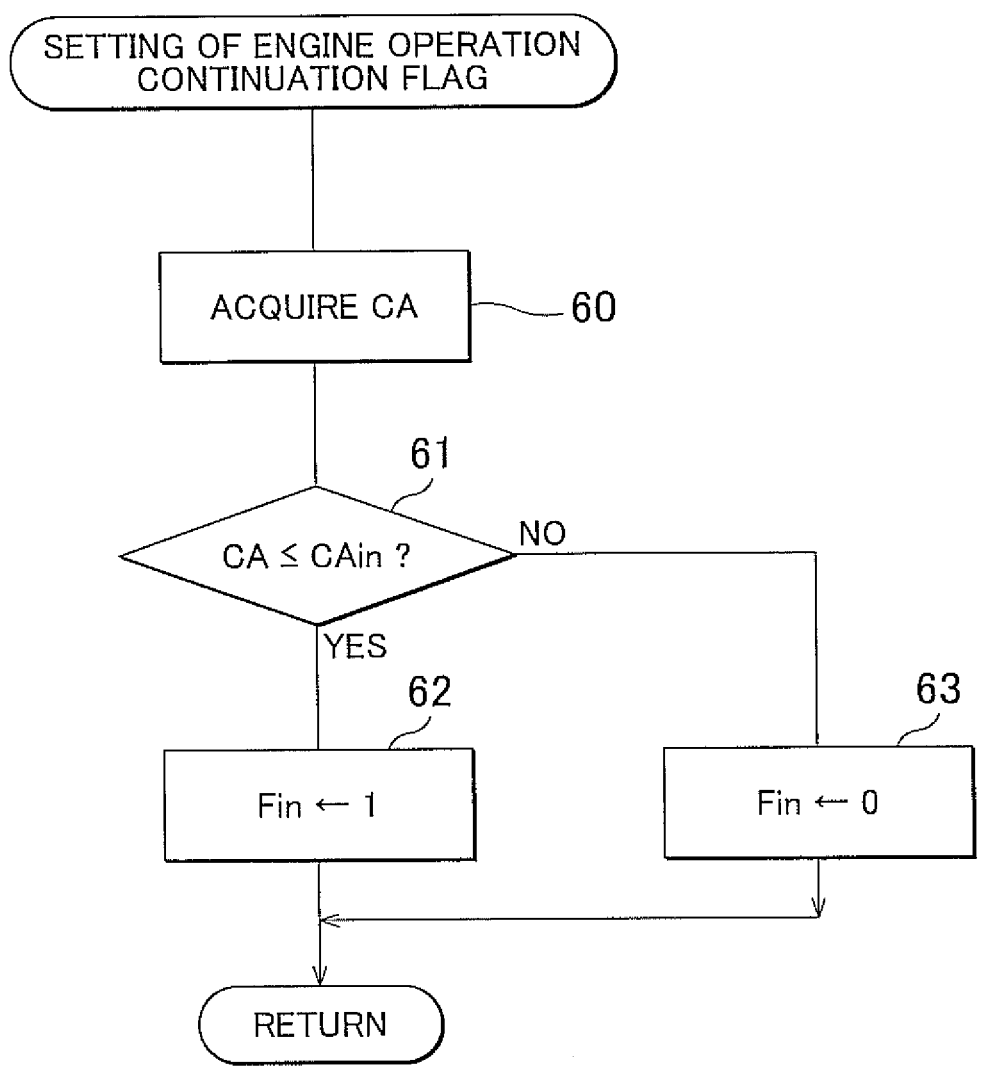
FIG. 8 is a view showing an example of a routine for setting an engine operation continuation flag according to the fourth embodiment of the invention.

Next, an example of a routine for setting the engine operation continuation flag that is used in step 50A of FIG. 7 will be described. An example of this routine is shown in FIG. 8. It should be noted that this routine is a routine that is executed every time a predetermined time elapses.

When the routine of FIG. 8 is started, the purification capacity CA of the catalyst is acquired first in step 60. It is then determined in step 61 whether or not the purification capacity CA of the catalyst acquired in step 60 is equal to or lower than an engine stop permission threshold CAin (CA≤CAin). In this case, when it is determined that CA≤CAin, the routine proceeds to step 62. The engine operation continuation flag Fin is then set (Fin←1), and the routine ends. On the other hand, when it is determined that CA>CAin, the routine proceeds to step 63. The engine operation continuation flag Fin is then reset (Fin←0), and the routine ends.

It should be noted that although each of the foregoing embodiments of the invention has been described using the compression self-ignition internal combustion engine, the invention is also applicable to a control apparatus for a power unit that is equipped with a spark ignition internal combustion engine (a so-called gasoline engine).

While the invention has been described with reference to the example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A control apparatus for a power unit that outputs a power and is equipped with an internal combustion engine and a catalyst that purifies components in exhaust gas discharged from a combustion chamber of the internal combustion engine, comprising:
a controller that:
sets, as an engine start threshold, a threshold that concerns an output power as a power output from the power unit and is used to determine whether to start operation of the internal combustion engine or not;
sets, as an engine stop threshold, a threshold that concerns an output power and is used to determine whether to stop operation of the internal combustion engine or not;
starts operation of the internal combustion engine when a required power as an output power required of the power unit during stop of operation of the internal combustion engine becomes equal to or larger than the engine start threshold;
stops operation of the internal combustion engine when the required power becomes equal to or smaller than the engine stop threshold during operation of the internal combustion engine;
obtains a reference engine start threshold that is an output power larger than zero and has been prepared in advance as a criterion for setting the engine start threshold;
obtains a reference engine stop threshold that is an output power equal to or larger than zero and has been prepared in advance as a criterion for setting the engine stop threshold;
obtains a start threshold correction threshold that is a threshold equal to or larger than zero and has been prepared in advance as a criterion which concerns a purification capacity of the catalyst and is used to determine whether to correct the reference engine start threshold or not;
sets a value smaller than the reference engine start threshold as the engine start threshold when the purification capacity of the catalyst is lower than the start threshold correction threshold,
sets a value equal to the reference engine start threshold or a value larger than the reference engine start threshold as the engine start threshold when the purification capacity of the catalyst is equal to or higher than the start threshold correction threshold; and
sets a value equal to the reference engine stop threshold as the engine stop threshold regardless of the purification capacity of the catalyst.

2. The control apparatus for the power unit according to claim 1, wherein
the controller sets a value that is smaller than the reference engine start threshold by a certain value, as the engine start threshold that is set when the purification capacity of the catalyst is lower than the start threshold correction threshold.

3. The control apparatus for the power unit according to claim 1, wherein
the controller sets a value that monotonically decreases as the purification capacity of the catalyst decreases with respect to the start threshold correction threshold, as the engine start threshold that is set when the purification capacity of the catalyst is lower than the start threshold correction threshold.

4. The control apparatus for the power unit according to claim 1, wherein
the controller sets a value that stepwise decreases as the purification capacity of the catalyst decreases with respect to the start threshold correction threshold, as the engine start threshold that is set when the purification capacity of the catalyst is lower than the start threshold correction threshold.

5. The control apparatus for the power unit according to claim 1, wherein
the controller sets a value that is larger than the reference engine start threshold by a certain value, as the engine start threshold that is set when the purification capacity of the catalyst is equal to or higher than the start threshold correction threshold.

6. The control apparatus for the power unit according to claim 1, wherein
the controller sets a value that monotonically increases as the purification capacity of the catalyst increases with respect to the start threshold correction threshold, as the engine start threshold that is set when the purification capacity of the catalyst is equal to or higher than the start threshold correction threshold.

7. The control apparatus for the power unit according to claim 1, wherein
the controller sets a value that stepwise increases as the purification capacity of the catalyst increases with respect to the start threshold correction threshold, as the engine start threshold that is set when the purification capacity of the catalyst is equal to or higher than the start threshold correction threshold.

8. The control apparatus for the power unit according to claim 1, wherein
the power unit is further equipped with an electric motor, and
the controller utilizes a power that is output from the electric motor, as part of a power that is output from the power unit when the required power is larger than zero.

9. The control apparatus for the power unit according to claim 1, wherein
the controller:
obtains an engine stop permission threshold that is a purification capacity of the catalyst which is lower than the stop threshold correction threshold and has been prepared in advance and that is used to determine whether operation of the internal combustion engine should be permitted to be stopped or not;
continues operation of the internal combustion engine even if the required power is equal to or smaller than the engine stop threshold while the purification capacity of the catalyst is equal to or lower than the engine stop permission threshold during performance of operation of the internal combustion engine that is started for a first time after the purification capacity of the catalyst becomes equal to or lower than the engine stop permission threshold; and
stops operation of the internal combustion engine when the required power becomes equal to or smaller than the engine stop threshold after the purification capacity of the catalyst becomes higher than the engine stop permission threshold.

10. A control apparatus for a power unit that outputs a power and is equipped with an internal combustion engine and a catalyst that purifies components in exhaust gas discharged from a combustion chamber of the internal combustion engine, comprising:
a controller that:
sets, as an engine start threshold, a threshold that concerns an output power as a power output from the power unit and is used to determine whether to start operation of the internal combustion engine or not;
sets, as an engine stop threshold, a threshold that concerns an output power and is used to determine whether to stop operation of the internal combustion engine or not;
starts operation of the internal combustion engine when a required power as an output power required of the power unit during stop of operation of the internal combustion engine becomes equal to or larger than the engine start threshold;
stops operation of the internal combustion engine when the required power becomes equal to or smaller than the engine stop threshold during operation of the internal combustion engine;
obtains a reference engine start threshold that is an output power larger than zero and has been prepared in advance as a criterion for setting the engine start threshold;
obtains a reference engine stop threshold that is an output power equal to or larger than zero and has been prepared in advance as a criterion for setting the engine stop threshold;
obtains a start threshold correction threshold that is a threshold equal to or larger than zero and has been prepared in advance as a threshold which concerns a purification capacity of the catalyst and is used to determine whether to correct the reference engine start threshold or not;
sets a value smaller than the reference engine start threshold as the engine start threshold when the purification capacity of the catalyst is lower than the start threshold correction threshold;
sets a value equal to the reference engine start threshold or a value larger than the reference engine start threshold as the engine start threshold when the purification capacity of the catalyst is equal to or higher than the start threshold correction threshold;
obtains a stop threshold correction threshold that is a threshold equal to or larger than zero and has been prepared in advance as a threshold, which concerns the purification capacity of the catalyst and is used to determine whether to correct the reference engine stop threshold, which is a value larger than zero, or not;
sets a value smaller than the reference engine stop threshold as the engine stop threshold when the purification capacity of the catalyst is lower than the stop threshold correction threshold; and
sets a value equal to the reference engine stop threshold or a value larger than the reference engine stop threshold as the engine stop threshold when the purification capacity of the catalyst is equal to or higher than the stop threshold correction threshold.

11. The control apparatus for the power unit according to claim 10, wherein
the power unit is further equipped with an electric motor, and
the controller utilizes a power that is output from the electric motor, as part of a power that is output from the power unit when the required power is larger than zero.

12. The control apparatus for the power unit according to claim 10, wherein
the controller:
obtains an engine stop permission threshold that is a purification capacity of the catalyst which is lower than the stop threshold correction threshold and has been prepared in advance and that is used to determine whether operation of the internal combustion engine should be permitted to be stopped or not;
continues operation of the internal combustion engine even if the required power is equal to or smaller than the engine stop threshold while the purification capacity of the catalyst is equal to or lower than the engine stop permission threshold during performance of operation of the internal combustion engine that is started for a first time after the purification capacity of the catalyst becomes equal to or lower than the engine stop permission threshold; and
stops operation of the internal combustion engine when the required power becomes equal to or smaller than the engine stop threshold after the purification capacity of the catalyst becomes higher than the engine stop permission threshold.

13. A control apparatus for a power unit that outputs a power and is equipped with an internal combustion engine and a catalyst that purifies components in exhaust gas discharged from a combustion chamber of the internal combustion engine, comprising:
a controller that:
sets, as an engine start threshold, a threshold that concerns an output power as a power output from the power unit and is used to determine whether to start operation of the internal combustion engine or not;
sets, as an engine stop threshold, a threshold that concerns an output power and is used to determine whether to stop operation of the internal combustion engine or not;
starts operation of the internal combustion engine when a required power as an output power required of the power unit during stop of operation of the internal combustion engine becomes equal to or larger than the engine start threshold;
stops operation of the internal combustion engine when the required power becomes equal to or smaller than the engine stop threshold during operation of the internal combustion engine;
obtains a reference engine start threshold that is an output power equal to or larger than zero and has been prepared in advance as a criterion for setting the engine start threshold;
obtains a reference engine stop threshold that is an output power larger than zero and has been prepared in advance as a criterion for setting the engine stop threshold;
obtains a stop threshold correction threshold that is a threshold equal to or larger than zero and has been prepared in advance as a threshold which concerns a purification capacity of the catalyst and is used to determine whether to correct the reference engine stop threshold or not;
sets a value smaller than the reference engine stop threshold as the engine stop threshold when the purification capacity of the catalyst is lower than the stop threshold correction threshold;
sets a value equal to the reference engine stop threshold or a value larger than the reference engine stop threshold as the engine stop threshold when the purification capacity of the catalyst is equal to or higher than the stop threshold correction threshold; and sets a value equal to the reference engine start threshold as the engine start threshold regardless of the purification capacity of the catalyst.

14. The control apparatus for the power unit according to claim 13, wherein the power unit is further equipped with an electric motor, and the controller utilizes a power that is output from the electric motor, as part of a power that is output from the power unit when the required power is larger than zero.

15. The control apparatus for the power unit according to claim 13, wherein the controller:

obtains an engine stop permission threshold that is a purification capacity of the catalyst which is lower than the stop threshold correction threshold and has been prepared in advance and that is used to determine whether operation of the internal combustion engine should be permitted to be stopped or not;

continues operation of the internal combustion engine even if the required power is equal to or smaller than the engine stop threshold while the purification capacity of the catalyst is equal to or lower than the engine stop permission threshold during performance of operation of the internal combustion engine that is started for a first time after the purification capacity of the catalyst becomes equal to or lower than the engine stop permission threshold; and stops operation of the internal combustion engine when the required power becomes equal to or smaller than the engine stop threshold after the purification capacity of the catalyst becomes higher than the engine stop permission threshold.

* * * * *